United States Patent
Matyjaszewski et al.

(10) Patent No.: US 12,166,203 B2
(45) Date of Patent: Dec. 10, 2024

(54) ELECTRODE COMPOSITIONS AND SYSTEMS FOR BATTERIES

(71) Applicant: CARNEGIE MELLON UNIVERSITY, Pittsburgh, PA (US)

(72) Inventors: Krzysztof Matyjaszewski, Pittsburgh, PA (US); Jay F. Whitacre, Pittsburgh, PA (US); Sipei Li, Pittsburgh, PA (US); Francesca Lorandi, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 748 days.

(21) Appl. No.: 17/414,742

(22) PCT Filed: Dec. 17, 2019

(86) PCT No.: PCT/US2019/066871
§ 371 (c)(1),
(2) Date: Jun. 16, 2021

(87) PCT Pub. No.: WO2020/131883
PCT Pub. Date: Jun. 25, 2020

(65) Prior Publication Data
US 2022/0077460 A1    Mar. 10, 2022

Related U.S. Application Data

(60) Provisional application No. 62/935,707, filed on Nov. 15, 2019, provisional application No. 62/918,507, filed on Feb. 1, 2019, provisional application No. 62/917,606, filed on Dec. 17, 2018.

(51) Int. Cl.
| | | |
|---|---|---|
| *H01M 4/38* | (2006.01) | |
| *H01M 4/04* | (2006.01) | |
| *H01M 4/62* | (2006.01) | |
| *H01M 10/0525* | (2010.01) | |
| *H01M 10/0562* | (2010.01) | |

(52) U.S. Cl.
CPC ......... *H01M 4/382* (2013.01); *H01M 4/0471* (2013.01); *H01M 4/622* (2013.01); *H01M 4/625* (2013.01); *H01M 10/0525* (2013.01); *H01M 10/0562* (2013.01); *H01M 2300/0065* (2013.01)

(58) Field of Classification Search
CPC .... H01M 4/382; H01M 4/0471; H01M 4/622; H01M 4/625; H01M 10/0525; H01M 10/0562; H01M 2300/0065; H01M 4/134; H01M 4/1395; H01M 4/366; H01M 10/052; H01M 10/058; H01M 10/4235; Y02E 60/10
See application file for complete search history.

(56) References Cited

U.S. PATENT DOCUMENTS

| | | | |
|---|---|---|---|
| 7,504,181 B2 | 3/2009 | Kohno | |
| 8,481,204 B2 | 7/2013 | Hama | |
| 9,960,451 B1 * | 5/2018 | Zhamu | H01M 4/625 |
| 10,170,789 B2 * | 1/2019 | Zhamu | H01M 4/405 |
| 11,335,946 B2 * | 5/2022 | Zhamu | H01M 4/13 |
| 2010/0035158 A1 | 2/2010 | Kato | |
| 2010/0047671 A1 | 2/2010 | Chiang | |
| 2014/0187901 A1 | 7/2014 | Cui | |
| 2020/0403230 A1 * | 12/2020 | Hong | H01M 4/1395 |
| 2021/0005852 A1 * | 1/2021 | Yang | H01M 50/119 |
| 2021/0143519 A1 * | 5/2021 | Cho | H01M 50/105 |

OTHER PUBLICATIONS

Qiu, J.; Charleux, B.; Matyjaszewski, K., Controlled/living radical Polymerization in Aqueous Media: Homogeneous and Heterogeneous Systems, Prog. Polym. Sci. 2001, 26, 2083-2134.
Davis, K. A.; Matyjaszewski, K., Statistical, Gradient, Block, and Graft Copolymers by Controlled/Living Radical Polymerizations, Adv. Polym. Sci. 2002, 159, 1-168.
Matyjaszewski, K. Controlled/Living Radical Polymerization. Progress in ATRP, NMP, and Raft, ACS Symposium Series 768, 2000, Chapter 1 pp. 1-26, Chapter 24 pp. 347-360 and Chapter 25 pp. 361-371.
Matyjaszewski, K., Bulk Atom Transfer Radical Polymerization, ACS Symp. Ser. 1998, 713, 96-112.
Matyjaszewski, K., et al., Organic-Inorganic Hybrid Polymers from Atom Transfer Radical Polymerization and Poly (dimethylsiloxane), ACS Symp. Ser. 2000, 729, 270-283.
Matyjaszewski, K., et al., The Preparation of Well-Defined Water Soluble-Swellable (Co)Polymers by Atom Transfer Radical Polymerization, ACS Symp. Ser. 2000, 765, 52-71.
Matyjaszewski, K., Comparison and Classification of Controlled/Living Radical Polymerizations, ACS Symp. Ser. 2000, 768, 2-26.
Matyjaszewski, K., Controlled/Living Radical Polymerization: State of the Art in 2002, ACS Symposium Series 2003, 854, 2-9.
Matyjaszewski, K., Controlled Radical Polymerization: State of the Art in 2008, ACS Symp. Ser. 2009, 1023, 3-13.
Matyjaszewski, K., Controlled Radical Polymerization: State-of-the-Art in 2011, ACS Symp. Ser. 2012, 1100, 1-13.
Matyjaszewski, K., et al., Atom Transfer Radical Polymerization, Chem. Rev. 2001, 101, 2921-2990.

(Continued)

*Primary Examiner* — Muhammad S Siddiquee
(74) *Attorney, Agent, or Firm* — BARTONY & ASSOCIATES LLC

(57) ABSTRACT

A process for the formation of a deformable battery electrode includes mixing a metal component including at least one of a metal or a metal alloy, a polymer component, and a dispersant component to create a mixture. The method further includes heated the mixture to a temperature above the melting point of the metal or the metal alloy and agitating the mixture to form a dispersion of the (molten) metal or the metal alloy in the mixture. The method further includes cooling the mixture to a temperature below the melting point of the metal or the metal alloy to form a stabilized dispersion of the metal or the metal alloy. The polymer component includes a polymer having a melting point equal to or below that of the metal or the metal alloy and a glass transition temperature sufficiently low that the stabilized dispersion is deformable.

24 Claims, 16 Drawing Sheets

(56) References Cited

OTHER PUBLICATIONS

Jean, Sang Jun et al.; Effects of poly(acrylic acid) and poly(ethylene oxide) adsorption on the stability of alumina suspension; Korean Journal of Chemical Engineering; vol. 20; No. 5; 2003; Abstract.

Bentor, Yinon; Periodic Table: Lithium. ChemicalElements.com—Lithium (Li); Feb. 9, 2014; www.chemicalelements.com/elements/li.html.

Polyvinylidene Fluoride, Wikipedia, Wikimedia Foundation, Jun. 8, 2017, https://en.wikipedia.org/w/index.php?title=Polyvinylidene_fluoride&oldid=784442934.

Matyjaszewski, K., Atom Transfer Radical Polymerization (ATRP): Current Status and Future Perspectives, Macromolecules 2012 45 4015-4039.

Matyjaszewski, K., et al., Synthesis of Nanocomposite Organic/Inorganic Hybrid Materials Using Controlled/"Living" Radical Polymerization, Chem. Mater. 2001, 13, 3436-3448.

Matyjaszewski, K., et al., Macromolecular Engineering by Atom Transfer Radical Polymerization, J. Am. Chem. Soc., 2014, 136, 6513-6533.

Schröder, Kristin et al., Towards sustainable polymer chemistry with homogeneous metal-based catalysts, Green Chemistry 2014, 16, 1673-1686.

Tsarevsky, Nicolay et al., "Green" Atom Transfer Radical Polymerization: From Process Design to Preparation of Well-Defined Environmentally Friendly Polymeric Materials Chem Rev 2007, 107, 2270-2299.

Yan, J.; Pan, X.; Wang, Z.; Lu, Z.; Wang, Y.; Liu, L.; Zhang, J.; Ho, C.; Bockstaller, M. R.; Matyjaszewski, K., A Fatty Acid-Inspired Tetherable Initiator for Surface-Initiated Atom Transfer Radical Polymerization, Chem. Mater. 2017, 29, 4963-4969.

Hui, Chin Ming et al., Surface-Initiated Polymerization as an Enabling Tool for Multifunctional(Nano-)Engineered Hybrid Materials, Chem. Mater. 2014, 26, 745-762.

Matyjaszewski, K. et al., General Concepts and History of Living Radical Polymerization, Eds. Handbook of Radical Polymerization; Chapter 8, Wiley: Hoboken, 2002, 361-406.

Matyjaszewski, K. et al. Mechanistic Aspects of Atom Transfer Radical Polymerization, Chapter 16. ACS Symp. Ser. 1998, 685, 258-283.

Matyjaszewski, K., Overview: Fundamentals of Controlled/Living Radical Polymerization, Ed. Controlled Radical Polymerization; Chapter 1, ACS: Washington, D. C., 1998; ACS Symposium Series 685, 2-30.

Konkolewicz, D.; et al., Sara ATRP or SET-LRP. End of controversy?, Polym. Chem. 2014, 5, 4396-4417.

Braunecker, Wade A. et al., Controlled/living radical polymerization: Features, developments, and perspectives, Prog. Polym. Sci., 2007, 32, 93-146.

\* cited by examiner

EO/LI⁺=30/1 V(PEO)/V(Li)=10:1.
Scale bar = 1 micron.

Enlarged view of portion of Fig. 3A

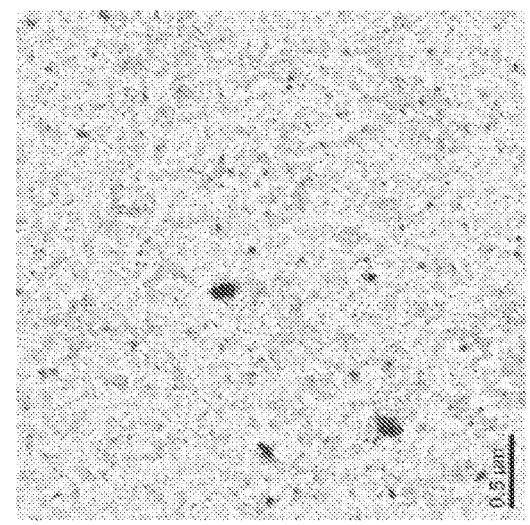
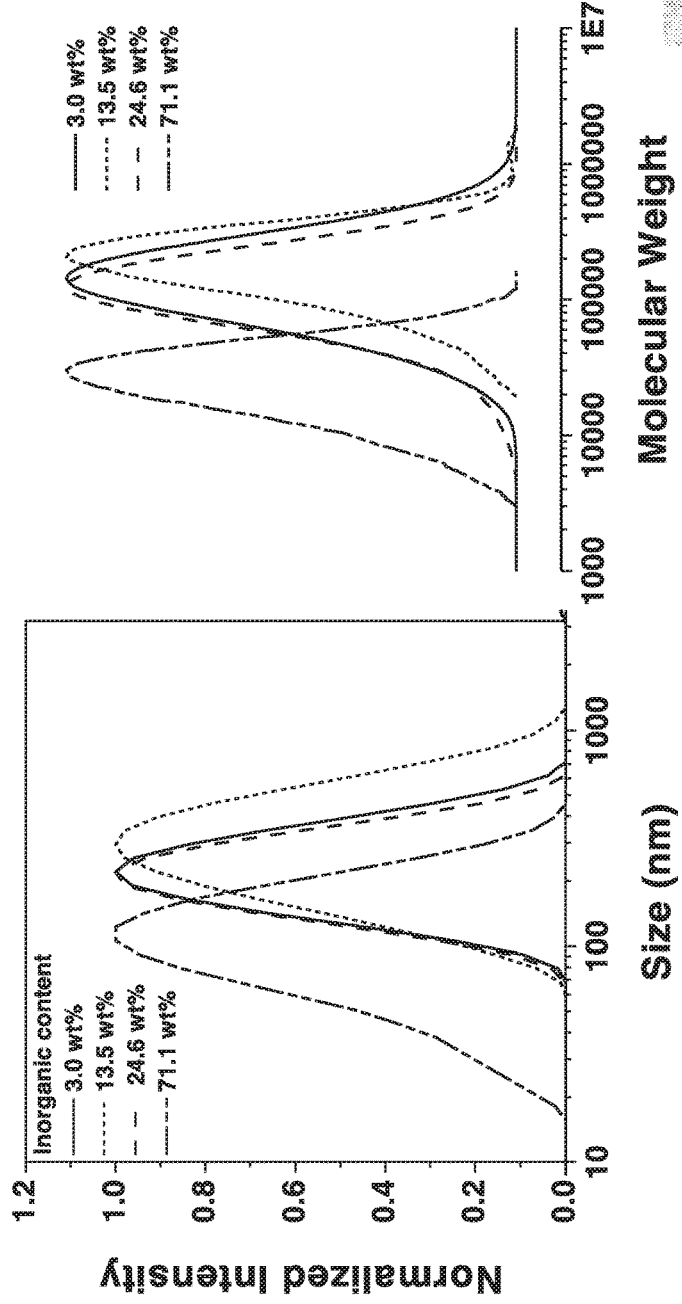
Fig. 8A  Fig. 8B  Fig. 8C

ELECTRODE COMPOSITIONS AND SYSTEMS FOR BATTERIES

CROSS-REFERENCE TO RELATED APPLICATIONS

This application is a US National Phase of the International PCT patent application number: PCT/US2019/066871 filed on Dec. 17, 2019, which claims benefit of U.S. Provisional Patent Application Ser. No. 62/917,606, filed Dec. 17, 2018, U.S. Provisional Patent Application Ser. No. 62/918,507, filed Feb. 1, 2019, and U.S. Provisional Patent Application Ser. No. 62/935,707, filed Nov. 15, 2019, the disclosures of which are incorporated herein by reference.

BACKGROUND

The following information is provided to assist the reader in understanding technologies disclosed below and the environment in which such technologies may typically be used. The terms used herein are not intended to be limited to any particular narrow interpretation unless clearly stated otherwise in this document. References set forth herein may facilitate understanding of the technologies or the background thereof. The disclosure of all references cited herein are incorporated by reference.

Lower cost, more energy dense, stationary or mobile energy storage devices are necessary for a range of battery applications. The promise of implementing a metallic lithium, high-performance anode (which has the lowest redox potential and highest theoretical capacity) in a lithium ion battery has been a quest for battery applications for at least three decades. However, existing lithium metal anodes usually suffer from poor cycle life and possess serious safety concerns. Major factors include a dramatic volume change during charge/discharge and the formation of dendrites. These problems are especially prominent for lithium anodes in the form of a metal foil.

The potential payoff is significant, and as battery technology continues to evolve, moving towards metal or metal-alloy electrodes is seen as one of the few pathways that may increase energy density and decrease costs. Specifically, a robust, safe, low-cost anode material containing a significant mass fractions of an ionically functional metal that has excellent interfacial and mechanical properties is needed to take full advantage of the next generation of solid-state electrolyte materials. However, the resulting solid/solid interface between lithium metal and solid electrolytes usually suffers from insufficient contact area and high interfacial resistance. As a result, most solid-state batteries cannot run at high capacity or current density. Indeed a key issue with these emerging solid-state materials is that they commonly suffer from failures related to interfacial segregation and local metal starvation. A novel electrode materials solution is therefore needed to solve the key problems associated with the implementation of material science that can pave the way for drastically improved battery technology. A further requirement of an anode is that the volume change during charge/discharge is mitigated and the dramatic volume and morphology change is controlled within the formed anode.

In a typical lithium ion battery including a liquid electrolyte, a stable solid electrolyte interface (SEI) layer is spontaneously formed between graphite anode and organic electrolyte. A stable SEI can prevent reduction of electrolytes by electrons, facilitate the flux and de-solvation of lithium ion, therefore greatly increase the cycling stability. Although a lithium metal anode shares the same principle of redox reactions as a graphite anode, SEI formed over a lithium metal anode is intrinsically unstable. The compositional inhomogeneity of such SEI layer leads to poor transport of lithium ions, repeated exposure of fresh lithium and consequently depletion of electrolyte and formation of detrimental lithium dendrites. As such, it is important to develop a conformal SEI layer that can regulate lithium ion flux on the surface of lithium anode while being consistently robust and ionically conductive for lithium metal anode.

Fabricating an artificial solid electrolyte interface (SEI) layer on the surface of lithium metal anode is one of the most reliable approaches to improve cycling stability of rechargeable lithium metal batteries. Two types of artificial SEI for lithium metal have been extensively explored; a polymeric coating and an inorganic coating. Polymer coating can be easily performed by solution casting or in situ formation with certain extent of flexibility/flowability. However, typical polymer coatings possess low ionic conductivity ($<10^{-5}$ Siemens/centimeter of S/cm) and poor mechanical strength, especially when swollen by an organic electrolyte. Moreover, because of the low transference number of most polymer materials, it's difficult to regulate the flux of lithium ion at the anode/electrolyte interface. On the contrary, inorganic coatings, such as $SiO_2$, $Al_2O_3$, ZnO, etc, have been proposed as an alternative, for their high shear modulus, functionality, and metallophilicity (for example, lithiophilicity). However, significant uncertainties associated with inorganic SEI include the lack of repeatability and consistency of coating preparations. Moreover, the brittleness of the inorganic layer cannot withstand the volume fluctuation during lithium stripping/plating.

SUMMARY

In one aspect, a process for the formation of a deformable battery electrode includes mixing a metal component including at least one of a metal or a metal alloy, a polymer component, and a dispersant component to create a mixture. The method further includes heating the mixture to a temperature above the melting point of the metal or the metal alloy and agitating the mixture to form a dispersion of the (molten) metal or the metal alloy in the mixture. The method further includes cooling the mixture to a temperature below the melting point of the metal or the metal alloy to form a stabilized dispersion of the metal or the metal alloy. The polymer component includes a polymer having a melting point equal to or below that of the metal or the metal alloy and a glass transition temperature sufficiently low that the stabilized dispersion is deformable.

The metal or the metal alloy may, for example, have a melting point below 300° C. In a number of embodiments, the metal or the metal alloy has a melting point below 230° C. The polymer may, for example, have a glass transition temperature no greater than 25° C., no greater than 0° C., no greater than −25° C., no greater than −50° C. or no greater than −70° C. In general, the storage modulus of the deformable battery electrode is less than the loss modulus thereof. The glass transition temperature of the polymer(s) of the polymer component determine a lower temperature of use/deformability of the deformable battery electrode.

In a number of embodiments, the metal or the metal alloy is an alkali metal or an alkali metal alloy. The metal may, for example, be lithium, sodium or potassium. In a number of embodiments, the metal is lithium. In a number of embodiments, the dispersion of the metal is a nano dispersion or a micro dispersion (that is, average particle size represent nanoparticles or microparticles).

The dispersant component may, for example, include at least one of a salt of the metal or the polymer. In a number of embodiments, the polymer is a single-ion polymer in which the metal is bound to an anion of the polymer or the polymer includes at least one functional group that reacts with the metal to form a single-ion polymer. A salt of the metal (or of the active/functional metal of a metal alloy) may be included in any embodiment to improve ionic conductivity.

The polymer may, for example, be a linear polymer, a branched polymer, a star polymer or a bottlebrush copolymer. In a number of embodiments, the polymer includes one or more groups distributed along the polymer backbone or present in one or more side chains that interact with the metal or the metal alloy. The one or more groups may, for example, include at least one of N, O, S, F, Cl, Br, I, P, C, or Si. In a number of embodiments, the polymer has a weight average molecular weight less than 2000, less than 1500 or less than 1000. In a number of embodiments, a shear modulus of the polymer is less than 1 MPa. In a number of embodiments, the ionic conductivity of the polymer at room temperature is at least $10^{-6}$ S/cm.

In a number of embodiments, the process further includes incorporating a conductive element or additive in the deformable electrode. The conductive additive may, for example, include at least one of the metal salt or carbon. Conductive carbons of any morphology or structure (including but not limited to carbon black, carbon nanotubes (CNT), graphene, etc.) may be used. Other conductive additive or fillers or conductive polymers such as polyaniline (PANi) or Poly (3,4-ethylenedioxythiophene) PEDOT, etc. may be used as conductive elements or additives herein. In a number of embodiments, the conductive additive includes a conductive carbon. The conductive additive may, for example, be incorporated after the mixture is cooled.

In a number of embodiment embodiments, the process further includes creating a suspension by adding a solvent to the stabilized dispersion after cooling, sonicating the suspension, and subsequently removing the solvent. The process may, for example, further include adding a conductive additive to the suspension before removing the solvent. The conductive additive may, for example, be a conductive carbon.

In a number of embodiment embodiments, the variation between a particle size of the metal particles in the stabilized dispersion and the average particle size is minimized. In a number of embodiments, a particle size of the metal in the stabilized dispersion varies from the average particle size by no more than 100%.

In another aspect, a battery includes an anode formed by the process described herein and a solid electrolyte, which is in ionic contact with the anode on a first surface of the solid electrolyte and in contact with a cathode on a second surface of the solid electrolyte.

In another aspect, a battery includes a deformable anode including a metal component including at least one of a metal or a metal alloy dispersed in a matrix including a polymer component and a dispersant component. The polymer component includes a polymer having a glass transition temperature sufficiently low that the anode is deformable (over a defined operational range of temperatures). A solid electrolyte is in ionic contact with the anode on a first surface of the solid electrolyte and in contact with a cathode on a second surface of the solid electrolyte. Many different solid electrolytes as known in the art are suitable for use in connection with the deformable electrodes/anodes hereof. The deformable anode may be further characterized as described above and elsewhere herein.

In another aspect, a deformable electrode includes a metal component including at least one of a metal or a metal alloy dispersed in a matrix including a polymer component and a dispersant component. The polymer component includes a polymer having a glass transition temperature sufficiently low that the electrode is deformable. The electrode may be further characterized as described above and elsewhere herein. The electrode may, for example, be a battery electrode.

In a further aspect, an electrode includes a metal or a metal alloy and a solid electrolyte interface on a surface of the metal or the metal alloy. The solid electrolyte interface includes a plurality of hybrid particles. The hybrid particles include an inorganic particle including covalently grafted polymer chains extending from a surface thereof. The electrode may, for example, be a battery electrode.

In a number of embodiments, the inorganic particles have an average particle size no greater than 10 microns, no greater than 1 micron, no greater than 500 nanometers, no greater than 100 nanometers or no greater than 10 nanometers. In a number of embodiments, an inorganic content of the plurality of hybrid particles is at least 3% or at least 10%. A weight average molecular weight of the grafted polymer chains and a grafting density may, for example, be within a predetermined range to result in the inorganic content of at least 3% or at least 10%.

In a number of embodiments, the dispersity of the grafted polymer chains is less than 2, less than 1.5 or less than 1.25. In a number of embodiments, the polymer of the grafted polymer chains exhibits an electrochemical stability window in the range of 0 to 5V. In a number of embodiments, the polymer of the grafted polymer chains exhibits an ionic conductivity at room temperature of at least $10^{-6}$ S/cm. The polymer of the grafted polymer chains may, for example, be sufficiently soluble in a membrane-forming solvent to form a self-standing film. In a number of embodiments, the grafted polymer chains exhibit swelling of no greater than 50% in a selected electrolyte.

The inorganic particles include silica, silicon, aluminum oxide, zinc oxide, yttria stabilized zirconia, $Fe_2O_3$, zirconia oxide, magnesium, or magnesium oxide. In a number of embodiments, the inorganic particles include silica or yttria stabilized zirconia. In a number of embodiments, the inorganic particles include yttria stabilized zirconia.

The grafted polymer chains may, for example, be formed via a reversible deactivation radical polymerization. In a number of embodiments, the grafted polymer chains are grown from the surface of the plurality of inorganic particles via surface-initiated atom transfer radical polymerization.

In a number of embodiments, the solid electrolyte interface exhibits an ionic conductivity of at least $10^{-5}$ s/cm at room temperature. In a number of embodiments, the solid electrolyte interface exhibits a shear modulus of at least 1 MPa. The solid electrolyte interface may, for example, be formed into a thin film on the metal or the metal alloy via solution casting.

The solid electrolyte interface may, for example, be formed by drop casting a solution containing the hybrid particles onto the surface of the lithium metal. In a number of embodiments, the inorganic particles have a positive surface charge.

In a number of embodiments, the solid electrolyte interface further includes a salt of the metal or of a functional metal of the metal alloy. In a number of embodiments, the metal is an alkali metal. The metal may, for example, be lithium.

In another aspect, a battery includes an electrode including hybrid particles as described above. In a number of embodiments, the electrode is an anode of the battery and the metal is an alkali metal. The battery may further include a cathode and a liquid electrolyte in ionic contact with the anode and the cathode. In a number of embodiments, the metal is lithium. The inorganic particles may, for example, include yttria stabilized zirconia. Many different liquid electrolytes as known in the art are suitable for use in connection with the electrodes hereof.

In a further aspect, a method of fabricating an electrode includes depositing a solid electrolyte interface on a surface of a metal or a metal alloy. The solid electrolyte interface includes a plurality of hybrid particles. Each of the hybrid particles includes an inorganic particle including covalently grafted polymer chains extending from a surface thereof.

In another aspect, an electrode (for example, a battery electrode) includes a metal or a metal alloy and a solid electrolyte interface on a surface of the metal or the metal alloy, the solid electrolyte interface including a polymer having fluoro and carboxylic acid functionality. The polymer may be formed via reversible deactivation radical polymerization. In a number of embodiments, the polymer is formed via atom transfer radical polymerization. In a number of embodiments, the polymer dispersity is minimized. The polymer may, for example, have a dispersity less than 1.5 or less than 1.25.

The solid electrolyte interface may, for example, be formed into a thin film on the metal via solution casting. In a number of embodiments, the metal is an alkali metal. The metal may, for example, be lithium, sodium or potassium. In a number of embodiments, the metal is lithium. The electrode may further include a salt of the metal or of a functional metal of the metal alloy.

The fluoro functionality of the polymer may be provided by at least one of covalently-bonded fluorine or by ionically-bonded fluoride.

In a further aspect, a battery includes an electrode including a solid electrolyte interface including a polymer having fluoro and carboxylic acid functionality as described above and elsewhere herein. The electrode may, for example, be an anode of the battery and a metal of the electrode may, for example, be an alkali metal. The battery further includes a cathode and a liquid electrolyte in ionic contact with the anode and the cathode. The metal may, for example, be lithium, sodium or potassium. In a number of embodiments, the metal is lithium. Many different liquid electrolytes as known in the art are suitable for use in connection with the electrodes hereof.

In still a further aspect, a method of forming an electrode includes depositing a solid electrolyte interface on a surface of a metal or a metal alloy. The solid electrolyte interface includes a polymer having fluoro and carboxylic acid functionality. The method may be further characterized as described above and elsewhere herein.

The present devices, systems, methods and compositions, along with the attributes and attendant advantages thereof, will best be appreciated and understood in view of the following detailed description taken in conjunction with the accompanying drawings.

BRIEF DESCRIPTION OF THE DRAWINGS

FIG. 8A FIG. 8A illustrates a dynamic light scattering or DLS traces of YSZ-g-PAN/$LiClO_4$ with different inorganic content.

FIG. 8B illustrates gel permeation chromatography or GPC traces of YSZ-g-PAN/$LiClO_4$ with different inorganic content.

FIG. 8C illustrates a TEM image of YSZ-g-PAN "hair" NPs with 24.6 wt % inorganic content.

DETAILED DESCRIPTION

Figure 1A:
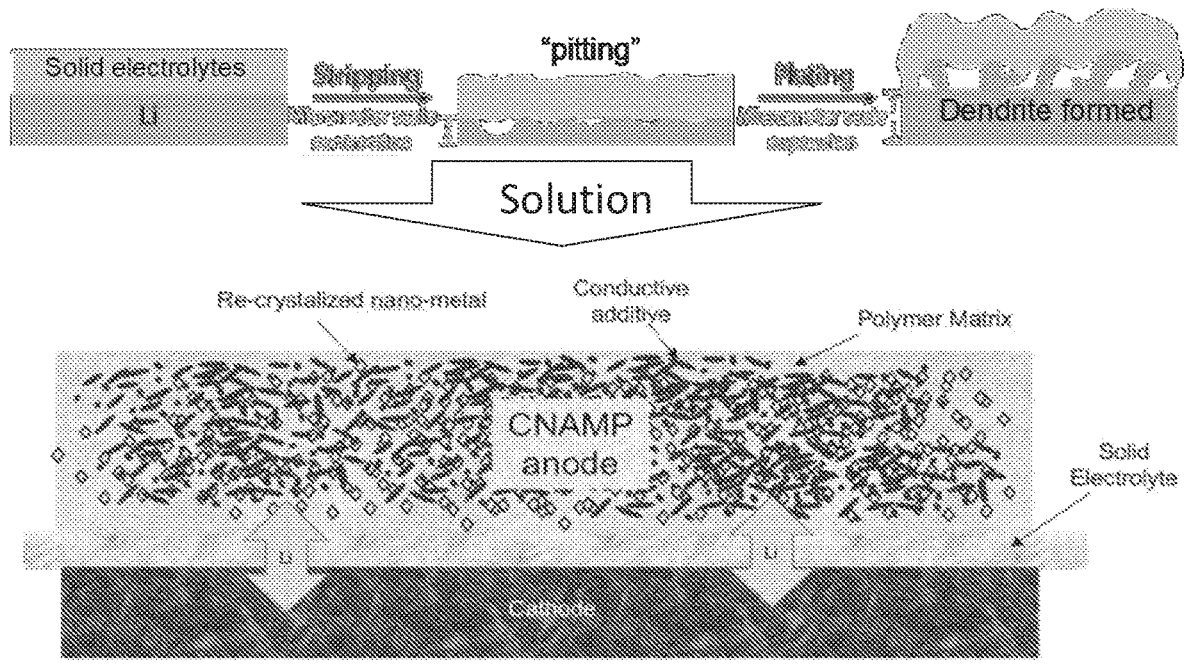
FIG. 1A illustrates schematically problems associates with solid anode/solid electrolyte interfaces in a battery and the improvements/advantages provided by an embodiment of an anode material hereof (with a distributed nano-crystalline alkali metal and conductive additive in a polymer matrix) when integrated with a solid electrolyte.

It will be readily understood that the components of the embodiments, as generally described and illustrated in the figures herein, may be arranged and designed in a wide variety of different configurations in addition to the described representative embodiments. Thus, the following more detailed description of the representative embodiments, as illustrated in the figures, is not intended to limit the scope of the embodiments, as claimed, but is merely illustrative of representative embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As used herein and in the appended claims, the singular forms "a," "an", and "the" include plural references unless the context clearly dictates otherwise. Thus, for example, reference to "a polymer" includes a plurality of such polymers and equivalents thereof known to those skilled in the art, and so forth, and reference to "the polymer" is a reference to one or more such polymers and equivalents thereof known to those skilled in the art, and so forth. Recitation of ranges of values herein are merely intended to serve as a shorthand method of referring individually to each separate value falling within the range. Unless otherwise indicated herein, and each separate value, as well as intermediate ranges, are incorporated into the specification as if individually recited herein. All methods described herein can be performed in any suitable order unless otherwise indicated herein or otherwise clearly contraindicated by the text.

The term "polymer" refers generally to a molecule which may be of high relative molecular mass/weight, the structure of which includes repeat units derived, actually or conceptually, from molecules of low relative molecular mass (monomers). The term "copolymer" refers to a polymer including two or more dissimilar repeat units (including terpolymers—comprising three dissimilar repeat units—etc.). The term "oligomer" refers generally to a molecule of intermediate relative molecular mass, the structure of which includes a small plurality of units derived, actually or conceptually, from molecules of lower relative molecular mass (monomers). In general, a polymer is a compound having >1, and more typically >10 repeat units or monomer units, while an oligomer is a compound having >1 and <20, and more typically leas than ten repeat units or monomer units. As used herein, the term "nanoparticle" refers to a particle having a dimension in the range of 1 nanometer (nm) to less than 1 micron (μm). The term "microparticle" refers to a particle having a dimension of 1 micron or greater to less than 1 millimeter (mm).

In a number of embodiments hereof, an electrode material (for example, an anode electrode material), which is particularly suited for use with solid electrolytes, includes a dispersed suspension of a metal or a metal alloy (for example, an alkali metal or an alkali metal alloy) within a polymer matrix. The material is a highly deformable, pliable, self-adapting, flexible or flowable system that has tunable mechanical and thermodynamic properties, and can, therefore, be used in either a flow-based battery system or as a more traditional static electrode in a battery system. In the formation of a deformable battery electrode in a number of embodiments hereof, a mixture is formed by mixing a metal or a metal alloy, a polymer component, and a dispersant component to create a mixture. The mixture is heated to a temperature above the melting point of the metal or metal alloy. The mixture is then agitated to form a dispersion of the metal within the mixture. Thereafter, the mixture to is cooled to a temperature below the melting point of the metal or metal alloy to form a stabilized dispersion of the metal or metal alloy. The polymer component includes at least one polymer having a melting point equal to or below that of the metal and a glass transition temperature sufficiently low that the stabilized dispersion is deformable over a desirable range of use.

In general, the polymer has a suitably low glass transition temperature, and is present in a suitable concentration in the stabilized dispersion, that the electrode material is deformable over a wide temperature range. In a number of embodiments, the polymer has a glass transition temperature no greater than 25° C., 0° C., −25° C., −50° C. or −75° C. In general, a lower Tg is more desirable to broaden the temperature range of use of electrode materials hereof. The melting point of the metal or metal alloy is sufficiently low that significant thermal degradation does not occur in the polymer(s) of the polymer component upon heating the mixture to a temperature above the melting point of the metal or the metal alloy. It is desirable that such thermal degradation is minimized or eliminated. In a number of embodiments, the metal or the metal alloy has a melting point below 300° C. or below 230° C. In the case of a very thermally stable polymer or polymers of the polymer component, it is possible to have an even higher melting point of the metal or metal alloy.

Polymers for use in the polymer component exhibit a deformable or pliable nature over the range or use of the electrodes hereof and exhibit ionic conductivity. In general, the polymer matrix of the deformable electrode material hereof exhibits a loss modulus that exceeds the shear modulus. In a number of embodiments, the shear modulus of polymers suitable for use herein is less than 1 Megapascal or (MPa), less than 100 Pascal (Pa), or less than 10 Pa. An ionic conductivity of such polymers at room temperature is at least 10-6 S/cm in a number of embodiments.

In a number of representative embodiments discussed herein, the metal is an alkali metal such as lithium, sodium or potassium or an alkali-metal alloy such as a sodium-potassium (NaK) alloy. In representative studies discussed herein, the metal is lithium (Li). Other metals of suitable melting point as described above can be used in the compositions hereof.

In a number of embodiments, nano- or microparticles of a metal/metal alloy are used in forming the electrode materials hereof. In a number of embodiments, the metal/metal alloy particles have an average diameter or particle size less than 100 μm, less than 100 nm, or less than 10 nm. In general, it is desirable to minimize the particle size of the metal/metal alloy particles. However, in certain embodiments metal/metal alloy microparticles suitable for use herein may be easier to prepare than nanostructures and, therefore, be more applicable for industrial purposes. In representative embodiments discussed herein, alkali-metal-based Composite Nano Alkali Metal/Polymer materials (sometimes referred to herein as CNAMP) were studied as illustrated in FIG. 1A. In a number of representative studies hereof, the metal was lithium. Once again, other metals or metal alloys having a suitable melting point as describe above (sodium, potassium, mercury, NaK etc.) can be used in the electrode materials hereof. FIG. 1A schematically summarizes several improvements in anodes for use in battery applications resulting from use of a dispersed/stacked pliable micro or nanoparticles of the metals/metal alloys in the present electrode materials as compared to use of a metal foil. The dispersed metal (for example, lithium) electrode materials hereof provide a number of advantages over metal foil electrodes. For example, a porous structure enhances the active surface area, thereby decreasing the local current density. Also interstitial cavities can reduce or eliminate problems associated with volume change during cycling. The powder/particulate form of the metal allows for a well-controlled mass-loading into the electrode materials, which is important when balancing mass of cathode and anode during cell assembly. The powder/particulate form also allows easy blending with components/functional additives (for example, polymer binder, conductive filler) for further improving cell performance.

Moreover, the deformable, pliable or flowable anode (or other electrode) composite, sometimes referred to a semi-liquid like metal anode (SLMA) herein, is able to conform or adapt to the solid electrolyte/anode interface (that is, to the surface of the solid electrolyte contacted by the anode) without losing contact or offering sites for dendrites to nucleate. Dendrite formation is far less likely in the electrode materials hereof than in metal foil electrodes, as an electronic/ionic composite system hereof surrounds particles of the functional metal in a deformable and elastic matrix thereby eliminating the prospect of formation of a dendritic front on the anode material, and thereby eliminating the risk of a device-level short associated with dendrites when working with, for example, a garnet type solid electrolyte such as $Li_{6.4}La_3Zr_{1.4}Ta_{0.6}O_{12}$.

The dispersed metal particles (exemplified by lithium in studied representative embodiments) hereof may be dispersed with a polymer or a polymer/dispersant matrix. In a number of embodiments, a metal salt of the dispersed metal was used as a small-molecule (or non-polymeric) dispersant. The metal salt assists in creating a uniform dispersion of the metal or metal alloy while providing ionic conductivity in the electrode material. In uniform dispersion hereof, the deviation or difference in metal particle size throughout the dispersion is preferably minimized. In a number of embodiments, the difference between individual particle size/diameter and average particle size/diameter is no greater than 100%, no greater than 75%, or even no greater than 50%.

The highly deformable/pliable electrode materials hereof have readily tunable mechanical and thermodynamic properties and can be used in either a flow-based battery system or as a more traditional static electrode suitable for use in portable or static storage batteries. Representative semiliquid lithium metal anodes or SLMA based on recrystallized lithium microparticles evenly or uniformly distributed in a dual-conductive (electronically and ionically) mono-functional polymeric matrix were prepared. The lithium-based SLMA showed liquid-like rheology properties under 25% shear strain, even at room temperature. The metal (for example, lithium) content of SLMA can go as high as, for example, 40 vol %. In the case of a lithium-based SLMA, such a lithium content would provide a theoretical volumetric energy density of 800 mAh/mL.

Once again, deformable, liquid-like form of the SLMA ensures sufficient contact at an anode/solid electrolyte interface and generation of a low interfacial resistance. As a result of the dual-conductive matrix and the higher surface area of the lithium microparticles or nanoparticles as compared to plain lithium chips/foils, the redox process during charge/discharge takes place within the entire three-dimensional electrode structure, thereby reducing the local current density and local volume change during lithium stripping/plating. At a slightly elevated temperature of 65° C., representative lithium-based SLMA hereof demonstrated stable lithium deposition behavior at the current density of 1 mA/cm$^2$ and an areal capacity of 1 mAh/cm$^2$ with an overpotential below 150 mA and an almost perfectly planar voltage profile for nearly 400 charge/discharge cycles.

The deformable electrode systems may, for example, be used in: (1) static electrode batteries that rely on next generation solid state electrolytes, (2) flow or hybrid-flow batteries that employ anode chemistries that include a flowable liquid that can be transported to and from cell reaction environments, and (3) non-flowing molten electrode systems that function at temperatures lower than, for example, 200° C. (higher temperatures may raise concerns about increased rate of corrosion, limited choice of electrolytes, increased cost for maintenance and manufacture, etc.).

Figure 1B:
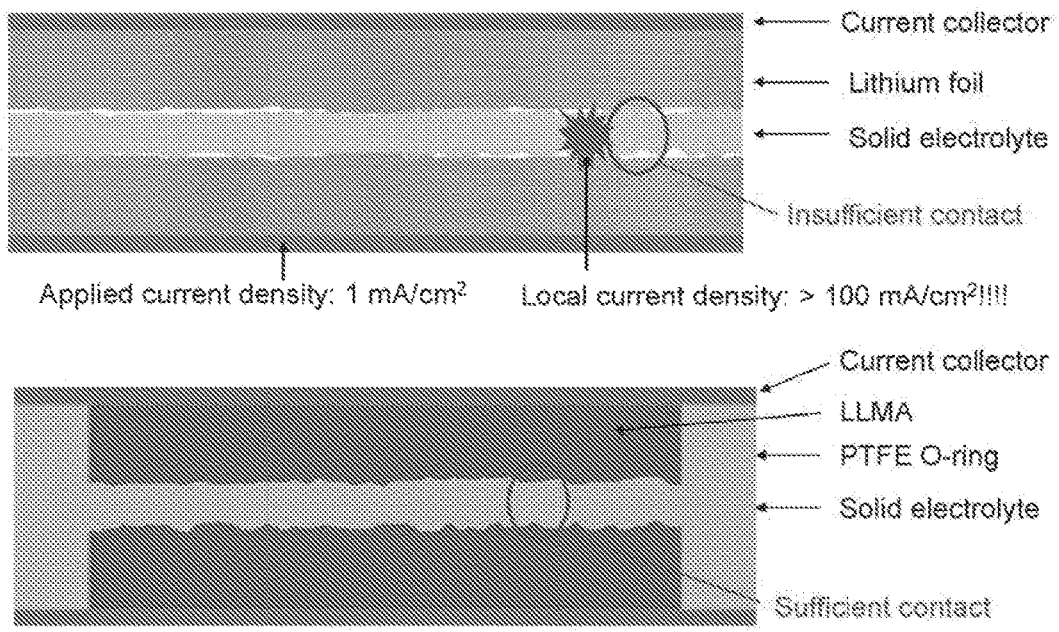
FIG. 1B illustrates an enlarged schematic representation of causes of problems associated with current solid-solid interface in a battery (upper schematic) and how such problem are resolved with a semiliquid like metal anode (SLMA)/solid electrolyte interface hereof (bottom schematic).

In a number of embodiments hereof, a suspended micro- or nano-crystalline metal/metal alloy electrode material is created via melting the metal or metal alloy within the polymer binder matrix and creating a stable dispersion in a polymer solution. Many issues associated with mechanical destabilization and loss of function of the host material can be eliminated by using pure metal active materials. Specific energy can be maximized. Further, the risk of dendrite formation can be significantly reduced or eliminated as a result of the lack of a clean interfacial nucleation point that can lead to typical dendrite development and eventual device failure. Batteries formed from a standard lithium foil and a lithium liquid metal anode (LLMA) are compared schematically in FIG. 1B. By reversing the typical solid/liquid interface in a battery to a liquid/solid interface as illustrates in FIG. 1B, the devices, systems, methods and compositions hereof provide a low-cost and up-scalable strategy of using solid electrolytes in, for example, a lithium metal based battery.

In a number of embodiments, the process to form electrode materials/electrodes hereof is exemplified by a representative, facile top-down approach for preparing Li microparticles (MPs) that includes chemical etching and emulsion formation. In that regard, a Li MP/carbon nanotube (CNT) composite anode (LMCA) was prepared using Li MPs produced in such a manner. The LMCA displayed improved electrochemical performance compared to a plain lithium foil anode in both symmetric cycling and in a full cell test.

Results with the LMCA demonstrated that the fabrication process hereof is simple, low cost, and provides a wide range of variables or parameters that can be adjusted to optimize the synthesized material to accommodate different mechanical environments and battery device structures. Such variables include, for example, polymer composition, architecture and distributed functionality, selection of the metal/metal alloy, addition of dispersing forming reagents (in that regard, metal-interactive or metal-reactive functionalities on the polymer may provide dispersant functionality or properties), and control over the ratio of the added reagents in the fabrication process. In a number embodiments of composite anodes hereof, the metal or metal alloy is present in a range of 10 to 80 vol %. In a number of embodiments, the metal or metal alloy is desirably present in the range of 40-50 vol %. The polymer component may, for example, be present in a range of 20 to 90 vol %. In a number of embodiments, the polymer component is present in the range of 50 to 60 vol %. A small molecule dispersant (for example, a metal salt) may, for example, be present in the range of 0 to 30 vol %. When present, the small molecule dispersant may, for example, be present in an amount of ½ the volume percent of the polymer vol %. In a number of embodiments hereof, a conductive filler may be present in the range of 0 to 20 wt %.

In the representative processes for fabricating a metal-based anode for use in conjunction with a solid electrolyte it was of high practical interest to design the metal-based electrode to be deformable or flowable at lower temperature. Further, the electrode materials hereof are chemically stable and can operate at high current density with low overpotential. The materials form a coherent, defect free, interface with a solid electrolyte. The viscosity/deformability and particle size of the dispersed metal in the formed anode material can be controlled by the molecular weight of the selected polymer (for example, a polyethylene oxide, a polyvinyl alcohol, a polymethylmethacrylate, a polyacrylonitrile.

Figure 2:
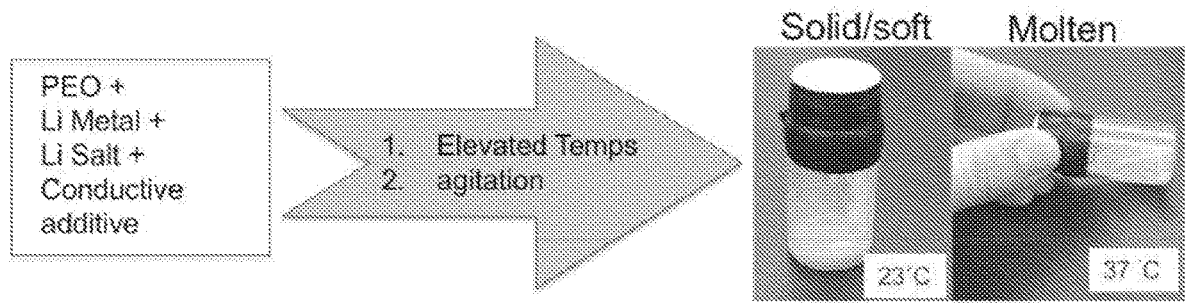
FIG. 2 illustrates schematically a simplified process for making an embodiment of a composite alkali metal particle/polymer material hereof.

In a number of representative studies, small, cut fragments of lithium foil were added into a glass vial containing a transparent polymer liquid that included a polyethylene oxide (PEO) such as polyethylene glycol monomethyl ether (CH$_3$(OCH$_2$CH$_2$)$_n$OH; MW=750, mPEG) and the hydrophilic lithium salt lithium bis(trifluoromethanesulfonyl)imide (LiC$_2$F$_6$NO$_4$S$_2$; LiTFSI) at 180° C. The lithium foil was immediately chemically "shredded" or "etched" to a smaller size by a chemical etching reaction between the terminal hydroxyl groups of mPEG and the lithium metal. In that regard, the hydroxy group react with the lithium to form end-group-lithiated PEG (a lithium alkoxide). The lithium metal started to melt at this temperature. Within 10 min, at a shearing speed of 800 RPM, the smaller metal particles started to form a greyish emulsion in the presence of the lithium salt and end-group-lithiated PEG medium. As a result of the chemical-etching step, a substantially lower shearing force is required than the case in which such an etching step is not used, and a greyish uniform emulsion was formed within 10 minutes. As a result of the protecting effect of the polymer medium, no corrosion of the glass vials from molten lithium was observed. The mixing/agitation was stopped after 15 minutes of agitation, and the mixture was allowed to cool down to room temperature. A simplified process for preparation of an exemplary lithium-based CNAMP material disclosed herein is illustrated in FIG. 2 (and is further discussed in the Experimental Examples section below).

Without limitation to any mechanism, it was hypothesized that when the alkali metal particles are formed and dispersed into an agitated melt of the matrix forming polymer and an alkali-metal-based salt, the dispersant or surfactant nature of the interaction between the melted polymer and added salt cause the metal to recrystallize into uniform micro- or nano-particles that are dispersed/suspended within the formed composite matrix.

After cooling, a liquid suitable to form a suspension such as anhydrous tetrahydrofuran or THF was added, and the mixture was sonicated overnight. The sonication broke down any particle aggregates and helped to clean the surface of the Li MPs by mechanically removing surface impurities that may have resulted from side reactions which occurred at high temperature. After sonication, a Li MP/THF suspension was formed, and the floating Li MP showed metallic luster.

The representative process described herein provides semiliquid metal electrode/anode materials based on a one-pot synthesis of metal or metal alloy (for example, lithium) nano/micro-particles distributed in a dual-conductive, electronically and ionically, mono-functional oligomeric matrix. The representative SLMA based on lithium exhibited a deformable, gel-like appearance at room temperature and became fluidic at moderately elevated temperature (for example, above 75° C.). In the representative examples, the recrystallized lithium microparticles were evenly distributed in the electronically and ionically dual-conductive monofunctional oligomeric polymeric matrix. As described above, the SLMA exhibited liquid-like rheology properties under 25% shear strain even at room temperature. The metal/lithium content of SLMA can be as high as 40 vol % with a theoretical volumetric energy density of 800 mAh/mL.

Figure 3A:
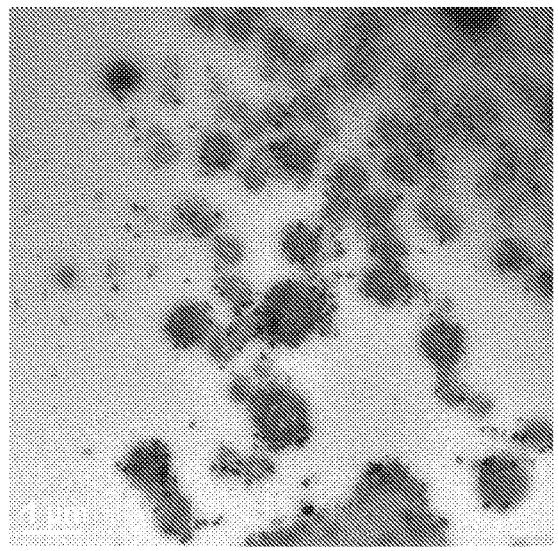
FIG. 3A illustrates a TEM image of a composite anode material containing $EO/Li^+=30/1$ $V(PEO)/V(Li)=10:1$ wherein the scale bar=1 micron.
Figure 3B:
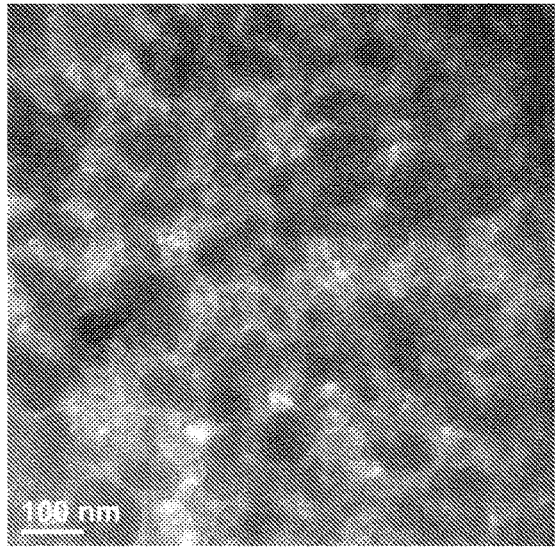
FIG. 3B illustrates an enlarged TEM image of the composite anode material of FIG. 3A wherein the scale bar=100 nm.

A mono, chain-end functionality of the polymer was found to be important in a number of studies hereof. The hydroxyl groups of the monofunctiional mPEG reacted with metallic lithium to form a lithium ion (that is, a single-ion polymer including an alkoxide anion and a lithium cation) and hydrogen, thereby accelerating the melting process of the lithium metal and enabling the use of lower shearing forces. The Li MPs prepared using mPEG had an average particle size or approximately 30~60 µm (see FIGS. 3A, 3B and 4).

Control over the ratio of reagents in the formulations hereof can, for example, include the use of molecules that combine more than one desired functionality. For example, a single-ion polymer may be selected to function as a dispersant to eliminate the need to add a small-molecule metal salt, thereby allowing the direct dispersion of the metal within the polymer matrix. Single-ion polymers include one or more anion groups immobilized (covalently or otherwise) on the polymer to which a cation of the metal can ionically bond. In the case of the use of metal alloy particles, a single metal of the metal alloy is typically the active or functional metal species in the electrode material. Use of a single-ion polymer in connection with a metal alloy may, for example, include cations of the active metal species.

The stripping/plating behavior of the SLMA was investigated with a garnet-type ceramic electrolyte separator $Li_{6.4}La_3Zr_{1.4}Ta_{0.6}O_{12}$ (LLZTO). The liquid-like form of the SLMA ensured efficient contact at the anode/electrolytes interface, providing low interfacial resistance. As a result of the dual-conductive polymeric medium, and the higher surface area of the lithium microparticles as compared to plain lithium chips, the redox process during charge/discharge takes place within the three-dimensional electrode structure, thereby reducing the local current density and local volume change during lithium stripping/plating. At the slightly elevated temperature of 65° C., the SLMA showed stable lithium deposition behavior at the current density of 1 mA/cm$^2$ and areal capacity of 1 mAh/cm$^2$ with overpotential below 150 mA and an almost perfectly planar voltage profile for nearly 400 cycles (see FIG. 5). As described above, the SLMA can go as high as 40 vol % metal particles with a theoretical volumetric energy density of 800 mAh/mL.

In another representative study, lithium chips were added to certain amount of a monomethoxy hydroxyl oligomeric ethylene glycol, MW=350, (MHOEG) that contained LiTFSI with the ratio of EO/Li=10/1. The mixture was heated to 200° C. and stirred for 15 min at rotation speed of 1000 RPM. At this temperature, the hydroxyl groups from the MHOEG quickly reacted with the lithium metal to generate lithium ions and hydrogen gas as described above. The process of chemical etching and emulsion formation occur at the same time. As described above, MHOEG function like a molecular scissor that facilitates reduction of lithium particle size, facilitating formation of a more uniform lithium distribution of metal particles in the formed emulsion. Together with the presence of LiTFSI, which serves as a role of surfactant/dispersant, a grey emulsion was formed within 5 min of mechanical agitation.

Once again, the role of OEG with monofunctional hydroxyl groups was found to be important. Neither bi-hydroxyl OEG nor bi-methoxyl OEG were able form a significantly stable pliable emulsion in a number of studies. Without limitation to any mechanism, it is possible that each of the functional groups of the studied bifunctional polymer reacted/interacted with lithium metal particle to, in essence, function as a crosslinker.

As illustrated in FIG. 2, when a mono-hydroxyl polyethylene oxide or PEO was selected as the matrix polymer, the formed composite material forms a soft, deformable solid or gel at 23° C. and becomes a molten alloy at 37° C. Selection of the polymer precursor of the final composite matrix allows control over the melting point of the CNAMP anode material (to, for example, allow use thereof in a flow battery).

TEM images of materials prepared at different ratios of lithium to oligo-EO demonstrated a uniform distribution of the formed lithium micro-particles. A comparison between the images also indicated that when the metal content is sufficiently high it can form inter-connected structures obviating to need for addition of conductive fillers.

Nevertheless, in representative procedures it was envisioned that the addition of carbon black, carbon nanotubes or other conductive fillers into the composite materials hereof (for example, after the Li particle synthetic step) would overcome a partial limitation that may occur when the lithium particles are well dispersed but not in intimate contact with each other in a static, non-stressed anode precursor. The conductive fillers create a secondary percolation network of electronically conductive material that allows charge/discharge with less polarization of the anode. In general, it is desirable to add any such conductive filler after cooling the melt, upon formation of a suspension using a suitable suspension forming fluid or solvent.

A conductive filler hereof may, for example, include conductive carbons of any morphology or structure (including but not limited to carbon black, carbon nanotubes (CNT), graphene, etc.), other conductive fillers, or conductive polymer such as PANi, PEDOT, etc.

The process of melting and then cooling/freezing out metal nanoparticles in a polymer matrix is broadly applicable to various metal-polymer combinations. Alkali metals such as lithium, sodium and potassium or other metals and metal alloys and polymers that are thermally stable at the melting point of the metal/metal alloy may be used in such a process. Furthermore, the precursor of the polymer matrix can be selected not only to control the melting point but also to interact with the added alkali metal salt and/or the melted alkali metal to enhance dispersion of the metal within the formed flexible/flowable matrix.

The weight average molecular weight of a polymer such as mPEG for use herein may, for example, be less than 2000, less than 1500 or less than 1000. Polymers of other compositions that provide a melting temperature equal to or less than the metal/metal alloy and suitable thermal stability at or above the melting point of the metal/metal alloy, such as polyethylene oxides, polyvinyl alcohols, polyacrylonitriles and polymethylmethacrylates may be used in the composition hereof.

The architecture of polymers for use herein may be linear or branched. Branched polymer structures such as peripherally functional stars, bottlebrush polymers or hyperbranched structures are well suited for the composition hereof. In addition to interacting with the added salt, metallophilic functionalized polymers can assist in stabilizing the melted alkali metal. Branched architectures may, for example, further enforce (architecturally) controlled dispersion of the metal micro/nano-particles in the electrode material. Groups or atoms that exhibit metallophilic properties (that is, an interaction or attraction with metals/metal alloys) include, but are not limited to, N, O, S, F, Cl, I, P, C, and Si.

Figure 5:
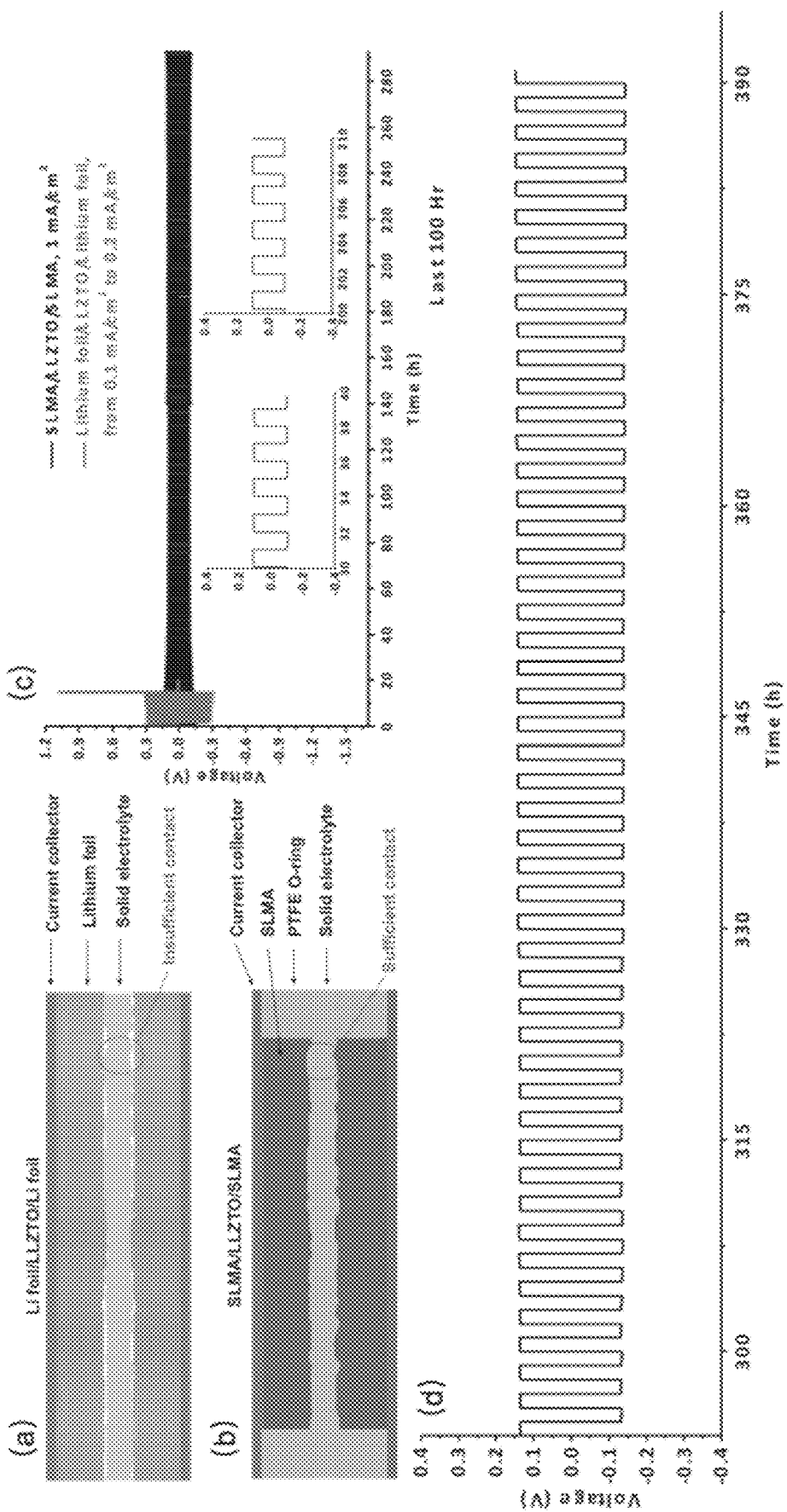
FIG. 5 illustrates: panel (a)—a schematic structural illustration of a Li foil/LLZTO/Li foil symmetric cell with poor interface contact; panel (b)—a schematic structural illustration of a SLMA/LLZTO/SLMA symmetric cell with sufficient interface contact; panel (c)—symmetric cycling of SLMA/LLZTO/SLMA at 1 $mA/cm^2$ and Li foil/LLZTO/Li foil at 0.1 to 0.2 $mA/cm^2$ at 65° C. wherein the half cycle time=1 h; and panel (d)—an enlarged scale voltage profile of the last 100 h of the symmetric cycling of SLMA/LLZTO/SLMA at 1 $mA/cm^2$.
Figure 6:
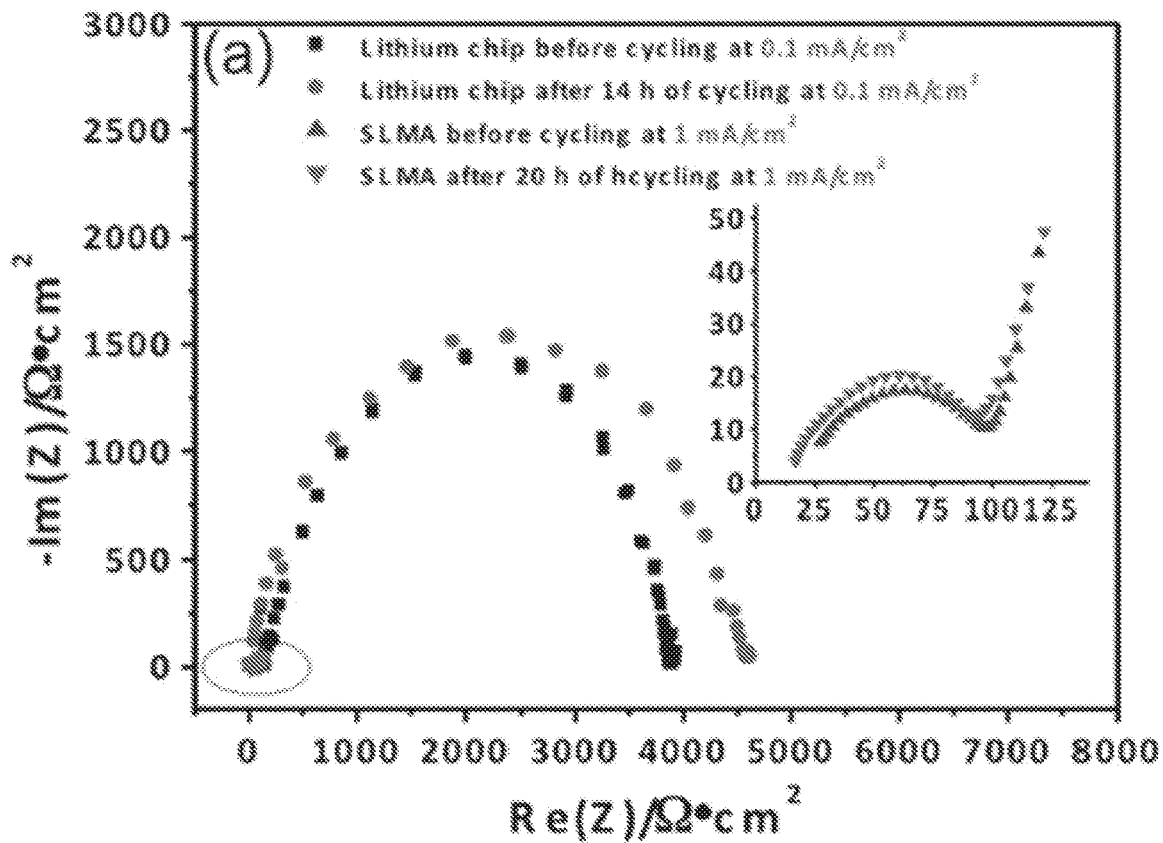
FIG. 6 illustrates: panel (a)—an electrochemical impedance spectroscopy or EIS study of Li foil/LLZTO/Li foil and EIS of SLMA/LLZTO/SLMAs cell before and after cycling; panel (b)—an SEM image of the isolated microparticle before cycling and panel (c)—an SEM image of the isolated microparticle covered after cycling at 1 $mA/cm^2$.
Figure 6:
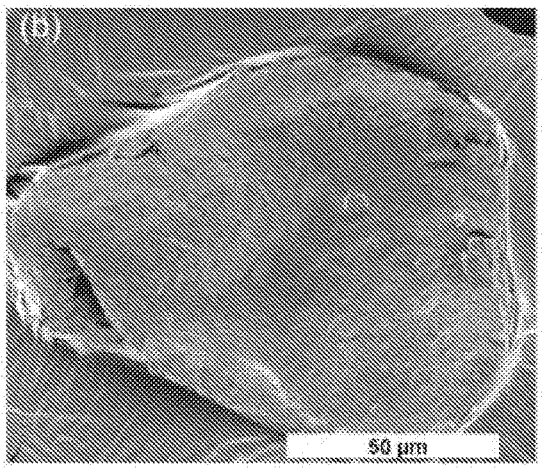
Figure 6:
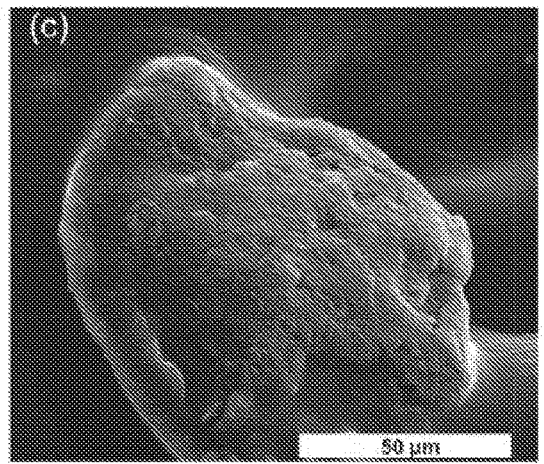

Representative studied SLMA hereof exhibited stable a stripping/plating voltage of ~150 mV without hysteresis over the long-term cycling as, for example, illustrated in panel (c) of FIG. 5. The inset in panel (c) of FIG. 5 illustrated an enlarged voltage profile as a function of time. During the cycling, EIS was performed to further study the impact of interfacial resistance on the lithium stripping/plating process. For the Li foil/LLZTO/Li foil symmetric cycling, the high overpotential was confirmed by EIS. The initial resistance reached ~4000 $\Omega \cdot cm^2$. After cycling at 0.1 $mA/cm^2$ for 14 h, the resistance increased to ~4500 $\Omega \cdot cm^2$ indicating formation of a destabilized electrode/electrolyte interface as illustrated in panel (a) of FIG. 6. For the SLMA/LLZTO/SLMA cell hereof, before cycling at 1 $mA/cm^2$, the initial interfacial resistance was around 100 $\Omega \cdot cm^2$. After 20 h of cycling at 1 $mA/cm^2$, the impedance remained at the same level, indicating a stable interfacial contact as illustrated inset of panel (a) of FIG. 6. Because of the dual-conductive nature of polymeric medium, the lithium is removed from the surface of the microparticles during stripping and was redeposited back to the original microparticles during plating. As a result, the lithium microparticles continue to behave in a breathing mode during stripping/plating and the volume change of the electrode can be largely mitigated. This behavior was confirmed by the morphology change observed by SEM. Panel (b) of FIG. 6 shows an isolated lithium microparticle before cycling, which shows a bare surface. After 20 hours of cycling at 1 $mA/cm^2$, a layer of lithium was observed to be coated on particles as illustrated in panel (c) of FIG. 6. Such a three-dimensional construction of the electrode, together with the continuous interfacial contact, explains the extremely stable lithium stripping/plating behavior demonstrated in panels (c) and (d) of FIG. 5.

In the case of batteries including liquid electrolytes, it is of great interest to fabricate a stable solid electrolyte interface or SEI layer that exhibit a combination of the advantages artificial polymeric and inorganic SEI (including, for example, high flexibility, high ductility, transference number and ionic conductivity). In a number of embodiments hereof, hybrid SEI are provided which and are easy to prepare (for example, via solution-based film formation techniques such as drop-casting).

In a number of other embodiments, multiple functionalities are introduced into a single polymer chain in a controlled manner to provide a polymeric SEI. It has been shown that the interaction between —COOH groups from various organic substrates and molten metal such as Li strongly improves the wettability of lithium metal, promoted by the formation of Li—C and especially Li—O bonds. Formation of metal-fluorine such as Li—F bonds has been found to enhance the wettability of Li metal. LiF has, for example, been found to promote uniform Li electrodeposition by reducing the activation energy barrier for the interfacial diffusion of $Li^+$ ions. Fluorine-enriched SEIs have previously been attempted through introduction of fluorinated additives into the electrolyte, or by increasing the concentration of salts such as Li bis(fluorosulfonyl)imide (LiFSI) in a polymeric SEI. In a number of embodiments hereof, an artificial polymeric SEI combines the strong interaction of —COOH groups with a metal (such as Li) and the advantages of a F-rich layer, which can further enhance the performances of batteries (such as Li metal batteries). In a number of representative embodiments, coating Li anodes with polymer or copolymers containing both —COOH functional groups (for example, introduced via a monomer to introduce acrylic acid or AA units or repeat groups or precursors thereof) and fluoride functionality (for example, introduced via a monomer with fluoride(s) in a side chain thereof or via fluoride counterions) provides a protective SEI layer with good mechanical stability, flexibility, ionic conductivity and the ability to promote smooth electrodeposition of Li ions.

In representative studies of hybrid SEI including inorganic particles with surface-grafted polymers hereof, the polymers were prepared by surface initiated atom transfer radical polymerization (SI-ATRP). In that regard, the hybrid SEI were prepared by grafting polymers from representative inorganic nanoparticles (yttria-stabilized zirconia NPs and silica NPs). It is also possible to attach polymers to inorganic particle surface in a "grafting to" approach in which polymers are prepared separately from the inorganic particle (for example, via a reversible-deactivation radical polymerization procedure) and subsequently covalently attached to a functionalized surface of the inorganic particle via reaction of a functional group of the polymer with a functional group on the inorganic particle surface.

Figure 7:
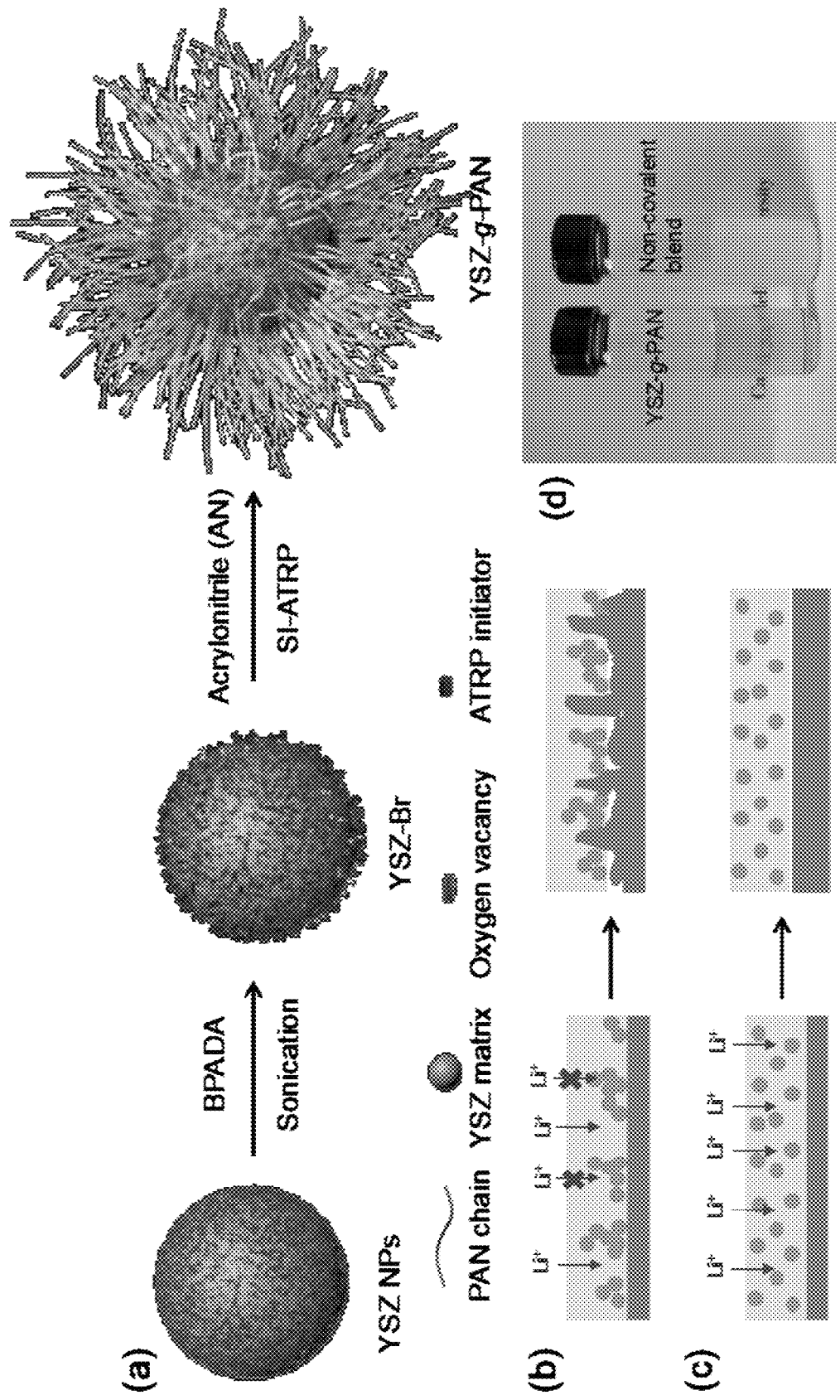
FIG. 7 illustrates: panel (a)—an embodiment of a synthesis route of an embodiment of yttrium stabilized zirconium-g-polyacrylonitrile or YSZ-g-PAN hybrids materials hereof (sometimes referred to herein as YSZ-g-PAN hairy nanoparticles): panel (b)—a schematic illustration of a non-uniform coating formed by non-covalent blend of YSZ nanoparticles or NPs and a $PAN/LiClO_4$ polymer that leads to non-uniform lithium deposition; panel (c)—a schematic illustration of uniform hybrids coating using YSZ-g-PAN/$LiClO_4$ and its consequential dendrite-free deposition; pane (d)—photographs of a transparent solution of 3 wt % of YSZ-g-PAN hybrid materials dispersed in DMF (left) and an opaque dispersion of 3 wt % non-covalent blend of YSZ NPs and PAN of same composition in DMF (right).

FIG. 7, panel (a) schematically illustrates an embodiment of a procedure hereof employed for fabricating artificial SEI of a representative lithium metal anode. Polyacrylonitrile or PAN was chosen for the polymer grafted from initiators on the surface of activated yttria-stabilized zirconia (YSZ) nanoparticles because of its wide electrochemical stability window, high ionic conductivity and good membrane forming ability. PAN also exhibits low swelling ability in liquid electrolytes. In a number of embodiments, polymers for attachment to inorganic particles exhibit an electrochemical stability window in the range of 0 to 5V vs an Li/Li+ electrode. An ionic conductivity of such polymer at room temperature is at least 10-6 S/cm in a number of embodiments. The grafted polymer chains may, for example, be sufficiently soluble in a membrane-forming solvent to form a self-standing film to facilitate formation of an SEI on a metal electrode such as a metal/metal alloy anode. Moreover, in a number of embodiments, the grafted polymer chains exhibits swelling of no greater than 50% in an electrolyte used in connection with the formed electrode.

Examples of inorganic particles suitable for use herein include, but are not limited to, silica, silicon, aluminum oxide, zinc oxide, yttria stabilized zirconia, $Fe_2O_3$, zirconia oxide, magnesium, and magnesium oxide. Particles including positive surface charge may be particularly well-suited for use herein. For example, the positive surface charges of YSZ NPs can selectively trap the anions, reduce the ion gradient near the anode, increase the transference number and homogenize the ion flux during lithium plating. Without limitation to any mechanism, it was hypothesized that covalently grafted YSZ-g-PAN could further improve the efficiency of the artificial SEI compared to non-covalent blends as a result of the rational summarized in panels (b) and (c) of FIG. 7. In that regard, it was hypothesized that (a) YSZ-g-PAN would exhibit improved solubility in organic solvents compared to non-covalent blends, resulting in more uniform particle distribution and higher mechanical integrity; (b) the reduced crystallinity caused by the homogeneous addition of inorganic filler could further increase the ionic conductivity of the artificial SEI; (c) as a result of a more uniform distribution of YSZ NPs, the ionic transport path could be more uniform across the membrane, further reducing the possibility of aggregation of lithium deposition.

An important factor in creating hybrids materials is the availability of chemical processes that allow tethering of polymer chains to inorganic components. The coupling of chains typically involves noncovalent coordination that is sensitive to minor differences in surface chemical composition and charge. As a result, it remains a challenge to effectively graft polymer from inorganic surfaces.

Reversible-Deactivation Radical Polymerization (RDRP) procedures, formerly referred to as controlled radical polymerization (CRP) procedures, which may be used in preparation of polymers for use herein, include, for example, Nitroxide Mediated Polymerization (NMP), Atom Transfer Radical Polymerization (ATRP), and Reversible Addition Fragmentation Transfer (RAFT) and others (including cobalt mediated transfer) that have evolved over the last two decades. RDRP provide access to polymer and copolymers comprising radically polymerizable/copolymerizable monomers with predefined molecular weights, compositions, architectures and narrow/controlled molecular weight distributions. Because RDRP processes can provide compositionally homogeneous well-defined polymers, with predicted molecular weight, narrow/designed molecular weight distribution, and high degrees of α- and ω-chain end-functionalization, they have been the subject of much study, as reported in several review articles and ACS symposia. See, for example, Qiu, J.; Charleux, B.; Matyjaszewski, K., *Prog. Polym. Sci.* 2001, 26, 2083; Davis, K. A.; Matyjaszewski, K. *Adv. Polym. Sci.* 2002, 159, 1; Matyjaszewski, K., Ed. Controlled Radical Polymerization; ACS: Washington, D.C., 1998; ACS Symposium Series 685. Matyjaszewski, K., Ed.; Controlled/Living Radical Polymerization. Progress in ATRP, NMP, and RAFT; ACS: Washington, D.C., 2000; ACS Symposium Series 768; and Matyjaszewski, K., Davis, T. P., Eds. Handbook of Radical Polymerization; Wiley: Hoboken, 2002, the disclosures of which are incorporated herein by reference.

Matyjaszewski and coworkers disclosed the fundamental four component ATRP process, comprising the addition, or in situ formation, of an initiator, in this case a molecule with a transferable atom or group that is completely incorporated into the final product, a transition metal and a ligand that forms, at least a partially soluble transition metal complex that participates in a reversible redox reaction with the added initiator or a dormant polymer to form the active species to copolymerize radically polymerizable monomers, in 1995.

ATRP has been discussed in numerous publications with Matyjaszewski as co-author and reviewed in several book chapters. See, for example, Matyjaszewski, K. et al. *ACS Symp. Ser.* 1998, 685, 258-283; *ACS Symp. Ser.* 1998, 713, 96-112; *ACS Symp. Ser.* 2000, 729, 270-283; *ACS Symrp. Ser.* 2000, 765, 52-71; *ACS Symp. Ser.* 2000, 768, 2-26; *ACS Symposium Series* 2003, 854, 2-9; *ACS Symp. Ser.* 2009, 1023, 3-13; *ACS Symp. Ser.* 2012, 1100, 1, and *Chem. Rev.* 2001, 101, 2921-2990; *Chem Rev* 2007, 107, 2270-2299 and *Prog. Polym. Sci.*, 2007, 32, 93-146, the disclosures of which are incorporated herein by reference. These publications, for example, provide information on the range of suitable transition metals that can participate in the redox reaction and suitable ligands for the different transition metals to form transition metal complexes of differing activities suitable for polymerizing broad range of exemplified polymerizable (co)monomers in various solvents and under different activation procedures. Se also *J. Am. Chem. Soc.*, 2014, 136, 6513-6533; and *Green Chemistry* 2014, 16, 1673, the disclosures of which are incorporated herein by reference. The general formula for such active catalyst complexes is Mt/L, wherein Mt is a transition metal with two stable oxidation states differing by 1, and L is a complexing ligand. Of the transitions metals, copper (Cu) is most often used in forming active catalyst complexes for ATRP. However, a wide range of other metals can be employed in an ATRP including Ti, Mo, Re, Fe, Ru, Os, Rh, Co, Ni, and Pd.

ATRP is the most efficient RDRP method for the preparation of pure segmented copolymers, since, generally, unlike RAFT it does not require addition of a standard free radical initiator to continuously form new polymer chains that do not contain the desired α-functional group in a blocking from or a grafting from reaction thereby producing purer segmented or hybrid products. In addition, unlike NMP, ATRP does not require high temperatures to generate the active species by homolytic cleavage of the dormant chain end, which precludes direct formation of bioconjugates, in addition to possessing the capacity to copolymerize a much broader range of radically copolymerizable monomers than NMP.

ATRP allows the synthesis of α, ω-homo and heterotelechelic multi-segmented copolymers with a predetermined degree of polymerization, narrow molecular weight distribution (low Mw/Mf), incorporating a wide range of functional monomers and displaying controllable macromolecular structures under mild reaction conditions. ATRP generally requires addition or formation of an alkyl halide or (pseudo)halide as an initiator (R—X) or dormant polymer chain end ($P_n$—X), and a partially soluble transition metal complex (Cu, Fe or Ru, for example) capable of undergoing a one electron redox reaction as a catalyst (although metal free ATRP procedures have recently been developed). See, for example, *ACS Macro Letters* 2015, 4, 192-196, the disclosure of which is incorporated herein by reference.

The generally accepted mechanism of an ATRP reaction is shown below

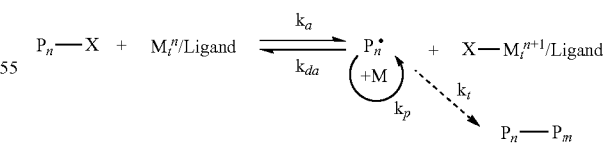

RDRP procedures may, for example, be used to prepare hybrid nanostructured particles by grafting from the surface of particles functionalized with agents to control the selected RDRP procedure and by grafting to the surface of the particles as described above. RDRP procedure facilitate control grafting density, molecular weight and composition of the tethered polymer/copolymer chain. Surface-initiated ATRP (SI-ATRP), a representative example of which is illustrated in FIG. 7, is one the most robust and widely used RDRP techniques for grafting a broad range of polymer chains, commonly called brushes, from various solid surfaces. See, for example, Chem. Mater. 2001, 13, 3436, the disclosure of which is incorporated herein by reference.

An important advantage of SI-ATRP is its applicability to various substrate surface geometries (for example, flat surfaces, nanoparticles, inside the pores of porous materials) and from different surface compositions, including, for example, metals and metal oxides, silicon, organic polymers, natural products, etc. To introduce polymer brushes via SI-ATRP onto a specific surface, the substrate surface must be initially modified with a suitable polymerization initiator, preferably evenly distributed throughout the surface, although patterned functionalization has also been exemplified. The attachment of alkyl halide-based initiators for SI-ATRP onto various substrates has been reported, including silica, polymer substrates, and bio-species. In many cases the initiator is anchored to the substrate via reaction with surface hydroxyl groups.

SI-ATRP is of particular utility as a result of its simple experimental setup with readily available initiators and catalysts that can be used in a range of solvents under a broad spectrum of reaction conditions. See, for example, J Am Chem Soc 2014, 136 6513 and Macromolecules 2012 45 4015, the disclosures of which are incorporated herein by reference. SI-ATRP allows for controlled macromolecular engineering of grafted polymer brushes and for control over all parameters, including brush length and molecular weight distribution, as well as brush grafting density. See, for example, Chem. Mater. 2014, 26, 745.]

While examining, the role of an alkyl-spacer between the tethering group and initiator functionality, it was discovered that a novel functional ATRP initiator, 12-(2-bromoisobutyramido)dodecanoic acid (BiBADA; see below) could be used as a reliable tetherable initiator with, for example, sub-10 nm magnetite nanoparticles. Moreover, the tetherable initiator with inherent high initiation efficiency (attributable to the "long" spacer between the tetherable group and initiating functionality) could be further expanded to other metal/metal oxide surfaces, resulting in an increase in grafting density of the formed composite nanoparticles, including limited grafting from α-alumina. It was determined that BiBADA could be considered to be a "universal" ATRP initiator, and other metal/metal oxide surfaces including MgO, TiO$_2$, ZrO$_2$, Mn$_2$O$_3$, CO$_3$O$_4$, NiO, Y$_2$O$_3$, In$_2$O$_3$, Sb$_2$O$_3$, La$_2$O$_3$, and CeO$_2$, were functionalized for grafting from polymerizations.

Recently, a fatty-acid derived approach to graft polymer from metals and metal oxides by surface-initiated atom transfer radical polymerization (SI-ATRP) has been reported. Yan, J.; Pan, X.; Wang, Z.; Lu, Z.; Wang, Y.; Liu, L.; Zhang, J.; Ho, C.; Bockstaller, M. R.; Matyjaszewski, K., A Fatty Acid-Inspired Tetherable Initiator for Surface-Initiated Atom Transfer Radical Polymerization, Chem. Mater. 2017, 29, 4963.

YSZ nanoparticles (NPs), as a metal oxide, are suitable for surface-functionalization by such a fatty-acid-based tetherable ATRP initiator as a result of the abundance of surface charges caused by the yttrium doping. However, the 2-bromoisobutyramide initiating group in 12-(2-bromoisobutyramido)dodecanoic acid (BiBADA) is far less active than the acrylonitrile chain end (AN-Br). To match the reactivity a new fatty-acid-like initiator, 12-(2-bromo-2-phenylacetamido)dodecanoic acid (BPADA), that is more compatible with the chain-growth of AN-Br was designed and synthesized as set forth in the scheme below.

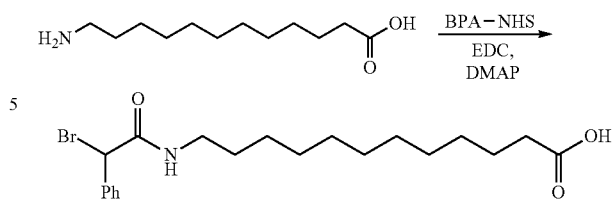

2-Bromo-2-phenylacetic acid (BPA) was first activated with N-hydroxysuccinimide (NHS) to differentiate its reactivity with the carboxylic group of 12-aminolauric acid followed by amidation. To immobilize ATRP initiators onto the surface YSZ NPs, BPADA and YSZ were sonicated together in the presence of triethylamine (TEA). Consequently, the initiator-functionalized YSZ NPs were unable to fully precipitate from tetrahydrofuran (THF) even at a rotational centrifugal force (RCF) of 4000 G, indicating successful anchoring of organic moieties onto the inorganic surface. The macroinitiator was then purified by dialysis against acetone to remove free molecules. SI-ATRP of AN was performed via initiator for continuous activator regeneration (ICAR) ATRP using 50-200 ppm Cu$^{II}$.[21] The resulted polymerization solution was purified by dialysis against N,N-dimethylformamide (DMF). A series of hybrids materials were prepared with inorganic content ranging from 3 wt % to 71.1 wt %, Table 1.

TABLE 1

YSZ-g-PAN hybrids synthesized by SI-ATRP.

| Entry | Inorganic content (wt %)[a] | Inorganic content vol %[a] | Molecular weight (MW)[b] | MW dispersity[b] | Particle size (nm)[c] | Grafting density (chain/nm$^2$) |
|---|---|---|---|---|---|---|
| 1 | 3.0 | 1.36 | 100,000 | 1.59 | 265.3 | 1.95 |
| 2 | 13.5 | 6.52 | 136,300 | 1.55 | 325.7 | 0.29 |
| 3 | 24.6 | 12.7 | 79,410 | 1.73 | 228.7 | 0.27 |
| 4 | 71.1 | 52.3 | 18,920 | 1.53 | 204.6 | 0.16 |

Figure 10A:
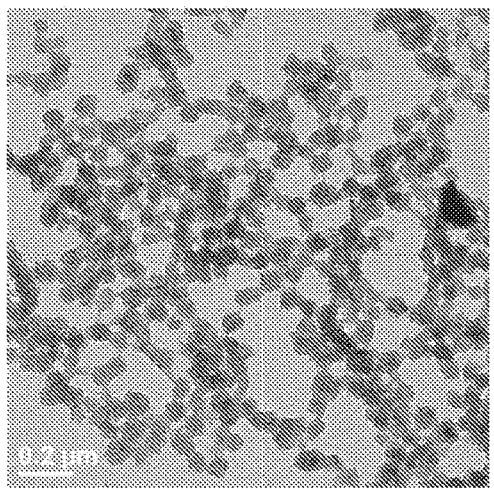
FIG. 10A illustrates a TEM image of YSZ-g-PAN hairy NPs with inorganic content of 13.5 wt %.
Figure 10B:
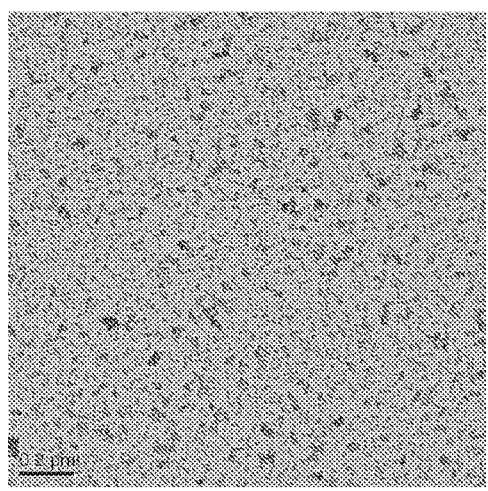
FIG. 10B illustrates a TEM image of YSZ-g-PAN hairy NPs with inorganic content of 71.1 wt %.
Figure 10C:
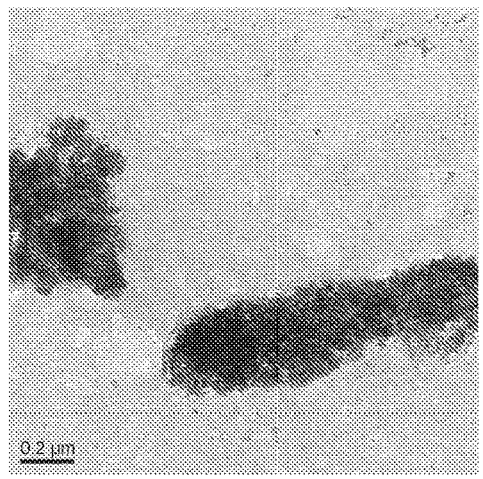
FIG. 10C illustrates a TEM image of a non-covalent blend of 24.6 wt % YSZ NPs with PAN, demonstrating significant aggregation.

[a]measured by TGA
[b]measured by GPC with DMF as eluting phase.
[c]measured by DLS FIG. 7, panel (d) demonstrates the dispersity difference between grafted YSZ/PAN system and non-covalent blends of the same composition. The left vial in the photograph is a DMF solution of 3 wt % YSZ-g-PAN with 24.6 wt % inorganic content after sitting on shelf for 6 months. The sample showed a form factor of transparent solution, demonstrating the extremely high dispersity of such a grafted system. In comparison, the right vial of the photograph of panel (d) is a newly prepared opaque dispersion of non-covalent blend of YSZ NPs and PAN of the same weight percentage. The uniform size distribution of the covalently grafted hybrids nanoparticles was further demonstrated by dynamic light scattering (DLS) analysis as shown in FIG. 8A. YSZ-g-PAN samples with different inorganic content all showed narrow particle distribution in DMF. Specifically, samples with inorganic content of 3.0 wt %, 13.5 wt %, 24.6 wt % and 71.1 wt %, respectively, had a size of 265.4 nm, 325.7 nm, 228.7 nm and 204.6 nm (Table 1). The grafted PAN chains were isolated by etching with HF. The molecular weights (MWs) were measured by gel permeation chromatography (GPC). As shown in FIG. 8B and Table 1, samples with inorganic content of 3.0 wt %, 13.5 wt %, 24.6 wt % and 71.1 wt % had a weight average MW of 100,000, 136,300, 79,410 and 18,920, respectively. These results suggested that the size of the YSZ-g-PAN hybrids is positively related to the length of the grafted polymer chain. TEM images of YSZ-g-PAN with inorganic content of 13.5 wt % (FIG. 10A), 24.6 wt % (FIG. 8C) and 71.1 wt % (FIG. 10B) showed YSZ NPs uniformly distributed across the view with little aggregations observe. In comparison, a blend of YSZ NPs (24.6 wt %) and PAN showed high extent of aggregations (FIG. 10C). These results demonstrated the advantage of achieving uniform YSZ NPs distribution through a covalent grafting approach.

Figure 9:
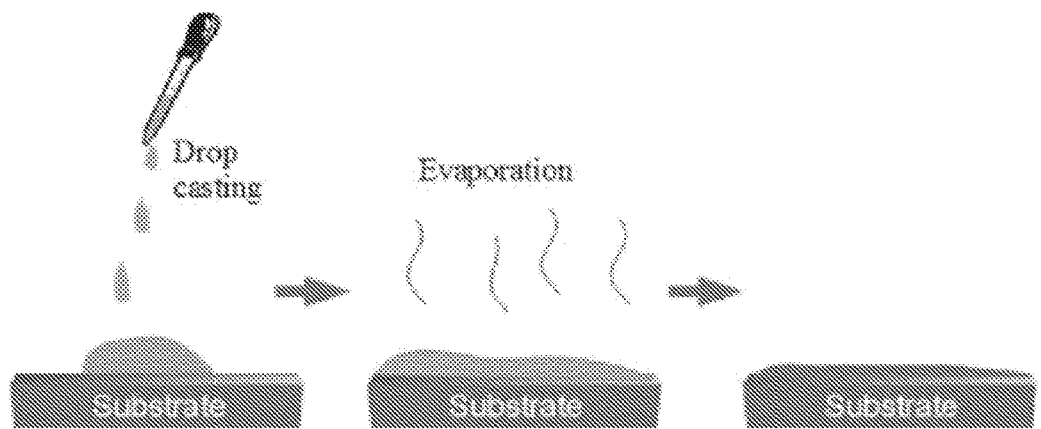
FIG. 9 illustrates schematically a process for drop casting a composition hereof onto a substrate metal.
Figure 11A:
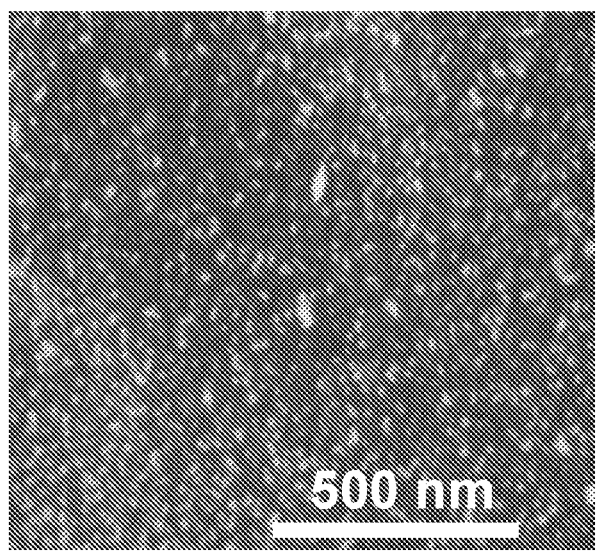
FIG. 11A illustrates a Focused Ion Beam milling combined with Scanning Electron Microscopy or FIB-SEM image of a cross-section of the artificial SEI formed using YSZ-g-PAN with inorganic content of 24.6 wt %.

Representative artificial SET were prepared by drop casting a DMSO solution containing YSZ-g-PAN and LiClO$_4$ onto the surface of fresh lithium chips as illustrated schematically in FIG. 9. A focused ion beam scanning electron microscope (FIB-SEM) was used to study the particle distribution of the artificial SET. FIG. 11A shows the cross-section of the artificial SET. Uniform distributions of nanoparticles were observed for samples prepared from YSZ-g-PAN of 24.6 wt % and 13.5 wt % inorganic content respectively, indicating the homogeneity of the artificial SET. Interestingly, for artificial SET prepared from YSZ-g-PAN with 71.1 wt % inorganic content, aggregations and gyroid-phase-like morphology was observed.

Figure 11B:
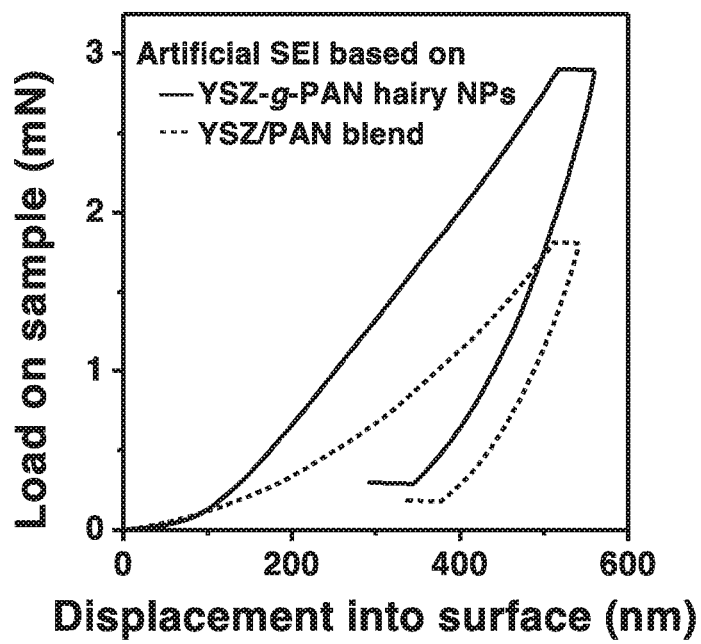
FIG. 11B illustrates characteristic load-displacement curves of artificial SEI formed using YSZ-g-PAN with inorganic content of 24.6 wt % and of artificial SEI formed using non-covalent YSZ/PAN blends of the same composition.

To quantify mechanical properties, nanoindentation was performed on membranes made of YSZ-g-PAN hairy NPs (inorganic content=24.6 wt %) and LiClO$_4$ and membranes made of the non-covalent blend with the same composition, respectively. Characteristic force displacement curves for the two samples are presented in FIG. 11B. No pile-up or sink-in was observed, allowing for the standard Oliver and Pharr analysis to be applied to calculate Yong's modulus and hardness as known in the art. The results indicated that the artificial SET based on YSZ-g-PAN hairy NPs showed both higher Yong's modulus (E~7.56 GPa) and higher hardness (H~0.34 GPa) than that of the non-covalent blend (E~4.65 GPa and H~0.22 GPa). Such superiority of the mechanical properties should be attributed to the higher uniformity of membranes prepared from YSZ-g-PAN hairy NPs. The results demonstrated that covalently grafted systems with more optimal particle distribution leads to improved membrane mechanical strength, suggesting possibly better electrochemical performance of the artificial SET.

Figure 11C:
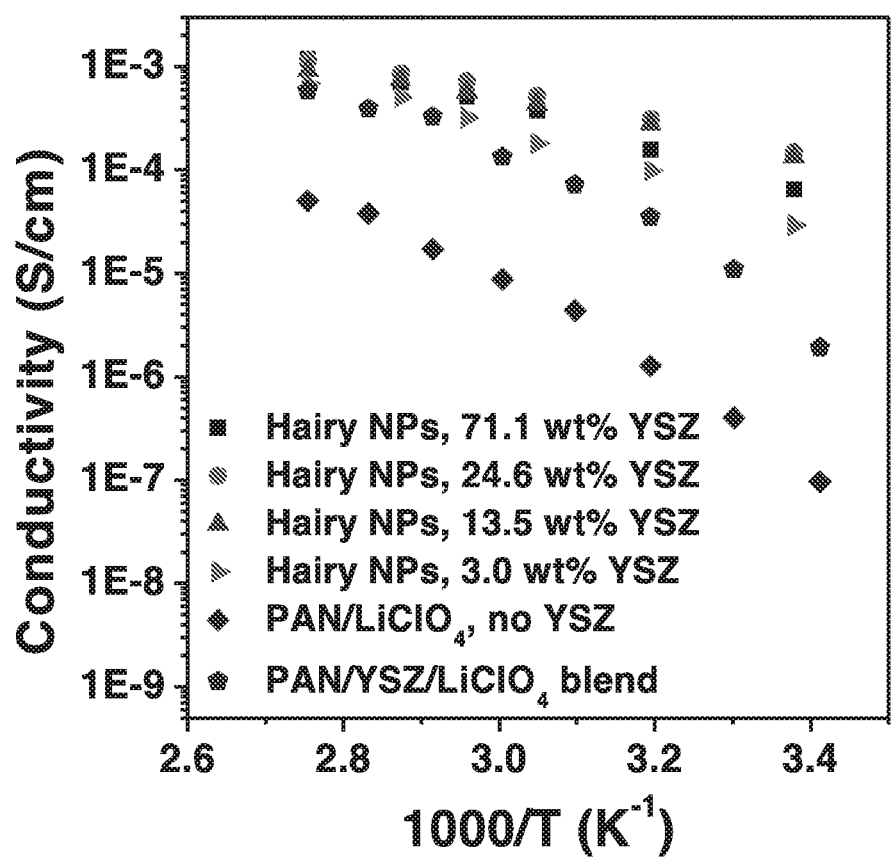
FIG. 11C illustrates Arrhenius plots of ionic conductivity of artificial SEI prepared from a mix of $LiClO_4$ and YSZ-g-PAN hairy NPs of different inorganic content.

Electrochemical impedance spectroscopy (EIS) was used to measure the ionic conductivity of membranes. Encouragingly, all YSZ-g-PAN/LiClO4 with different inorganic contents showed greatly improved ionic conductivity compared to pure PAN/LiClO4 or non-covalent blend of YSZ nanowires, PAN and LiClO4 (see FIG. 11C), which were reported in previous literature. Samples with inorganic content of 3.0 wt %, 13.5 wt %, 24.6 wt % and 71.1 wt % showed room-temperature ionic conductivity of $0.29 \times 10^{-4}$ S/cm, $1.35 \times 10^{-4}$ S/cm $1.49 \times 10^{-4}$ S/cm and $0.65 \times 10^{-4}$ S/cm respectively, which are about two orders of magnitudes higher than the ionic conductivity of non-covalent YSZ/PAN/LiClO4 blends. At 90° C., the ionic conductivities increased to $6.8 \times 10^{-4}$ S/cm, $9.16 \times 10^{-4}$ S/cm, $1.15 \times 10^{-3}$ S/cm and $1.20 \times 10^{-3}$ S/cm respectively, suggesting that inorganic content of 24.6 wt % gave the best overall lithium ion transport properties. These results further demonstrate the superior properties of YSZ-g-PAN systems. In a number of embodiments hereof, inorganic content is at least 3 wt % or at least 10 wt %. The ionic conductivity of the SEI hereof is at least $10^{-5}$ S/cm at room temperature, and the shear modulus is preferably at least 1 MPa.

Figure 12:
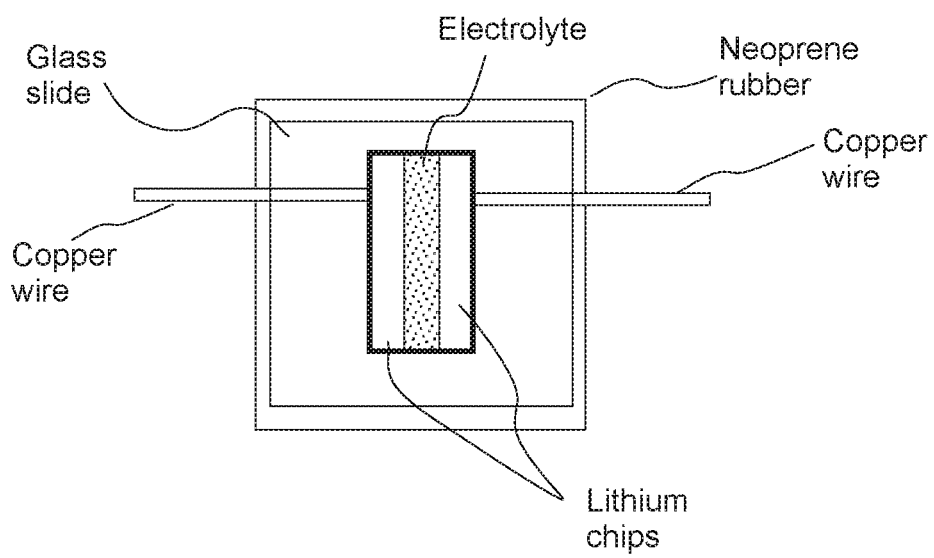
FIG. 12 illustrates a schematically a visualization cell used in studies of electrodes hereof.
Figure 13:
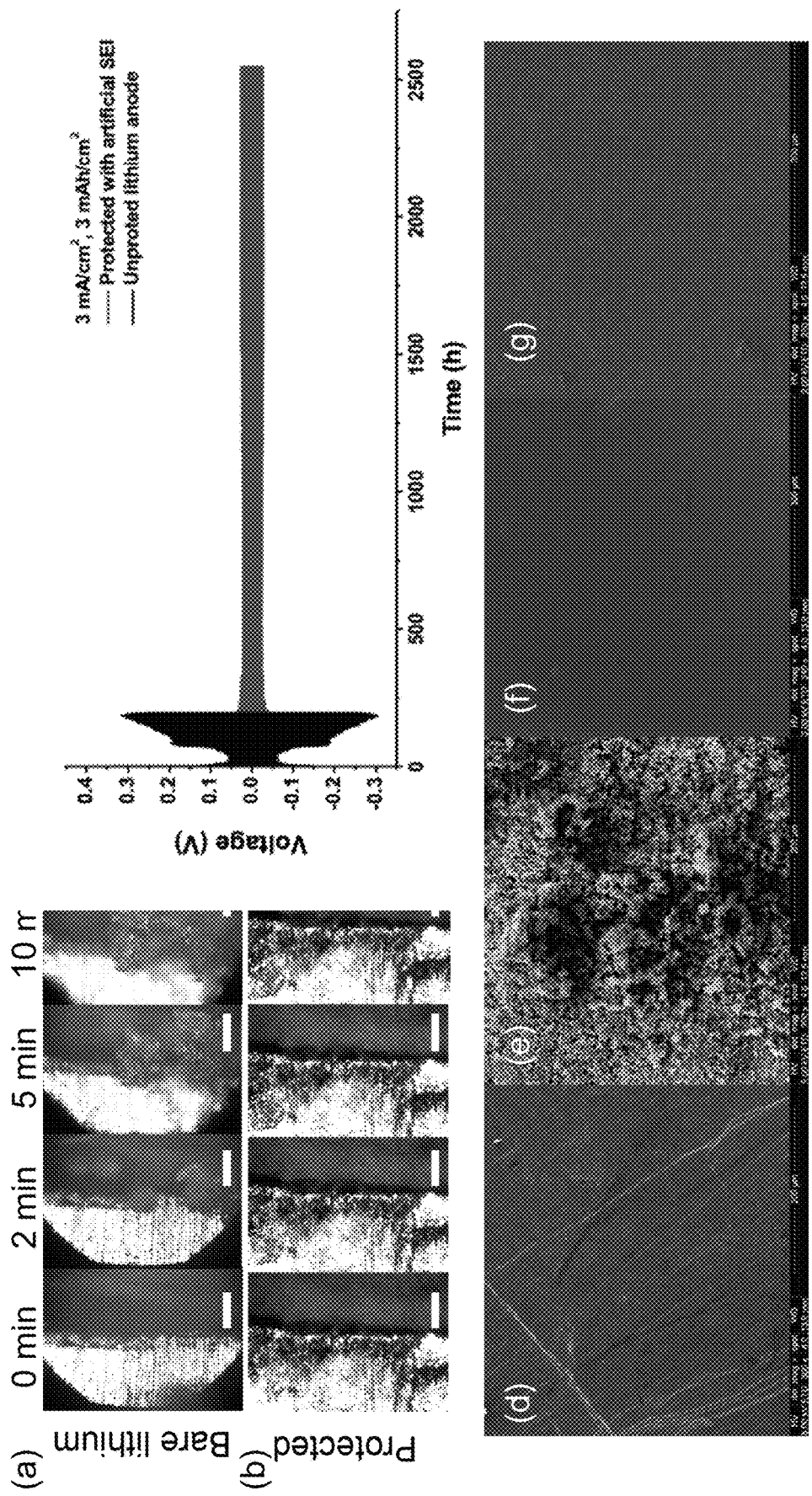
FIG. 13 illustrates: panel (a) an optical microscope image of surface of unprotected lithium during lithium deposition at current density of 5 $mA/cm^2$ (wherein the scale bar=100 micron); panel (b) an optical microscope image of surface of a lithium chip protected with artificial SEI using YSZ-g-PAN with 24.6 wt % inorganic content during lithium deposition at current density of 5 $mA/cm^2$ (wherein the scale bar=100 micron); panel (c) symmetrical cycling of a protected lithium anode using YSZ-g-PAN with 24.6 wt % inorganic content and an unprotected lithium anode at current density of 3 $mA/cm^2$ for 1 hour each half step wherein the broken vertical line separates the protected and unprotected lithium; (d) and (e) SEM images of bare lithium anode before cycling and after cycling, respectively, at 3 $mA/cm^2$ (wherein the scale bar=300 micron); panels (f) and (g) SEM images of lithium anode protected with artificial SEI using YSZ-g-PAN with 24.6 wt % inorganic content before cycling and after cycling, respectively, at 3 $mA/cm^2$ (wherein the scale bar=300 micron).
Figure 14A:
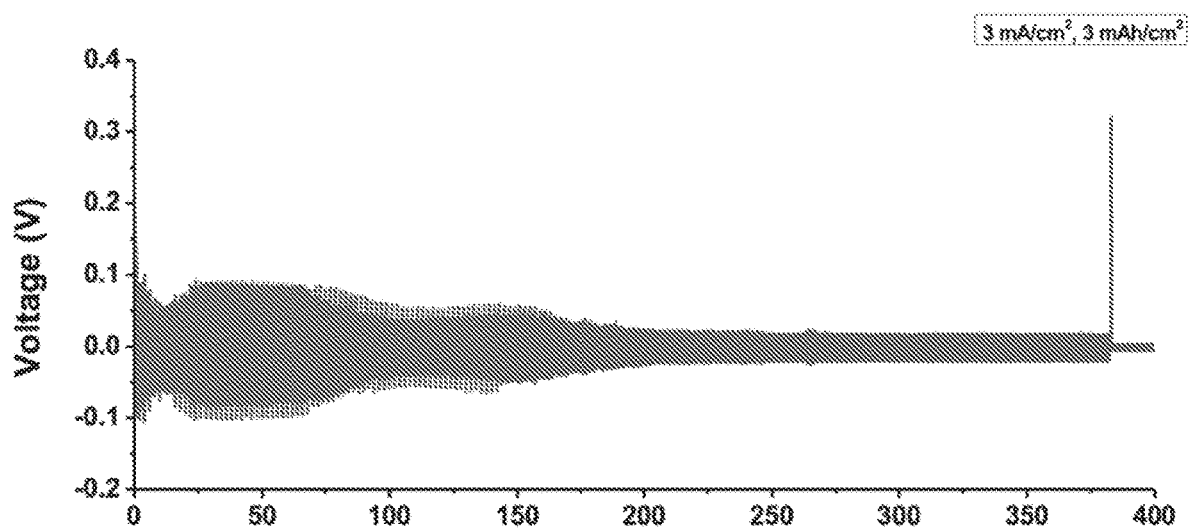
FIG. 14A illustrates symmetric cycling of protected lithium using YSZ-g-PAN with 13.5 wt % inorganic content at current density of 3 $mA/cm^2$ for 1 hour each half step.
Figure 14B:
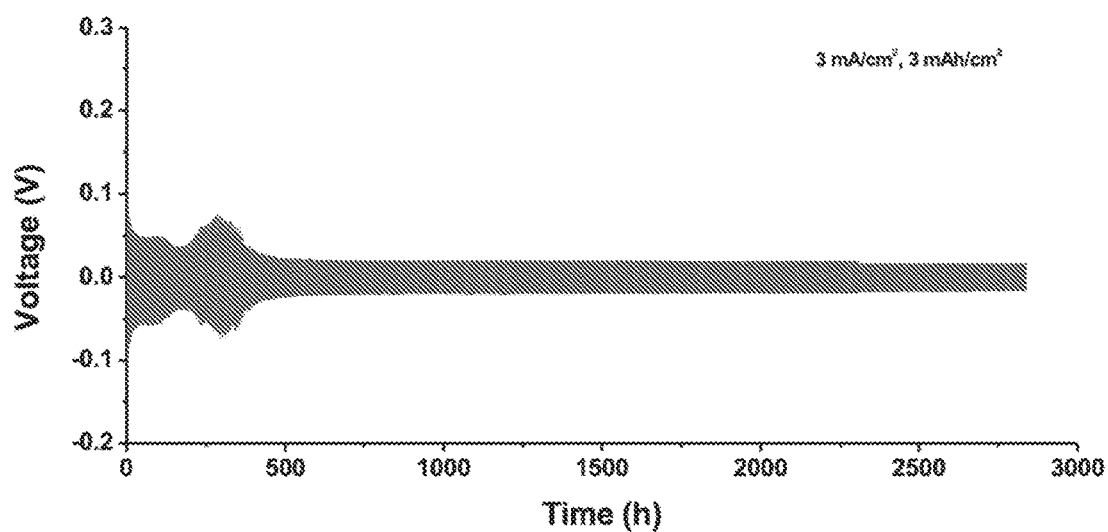
FIG. 14B illustrates symmetric cycling of protected lithium using YSZ-g-PAN with 71.1 wt % inorganic content at current density of 3 $mA/cm^2$ for 1 hour each half step.
Figure 15:
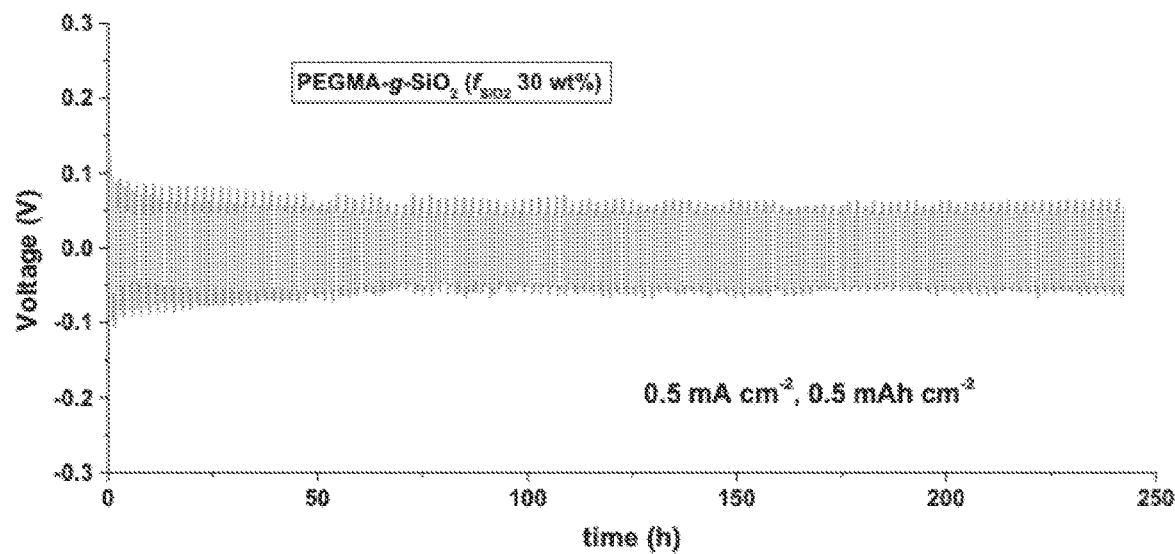
FIG. 15 illustrates symmetric cycling at a current density of 0.5 mA $cm^{-2}$, with 1 $LiPF_6$ in EC:DMC 1:1 as electrolyte, for Li chips coated with $PEGMA-g-SiO_2$ (intermediate inorganic content, $f_{SiO2}$=30.41 wt %).
Figure 16:
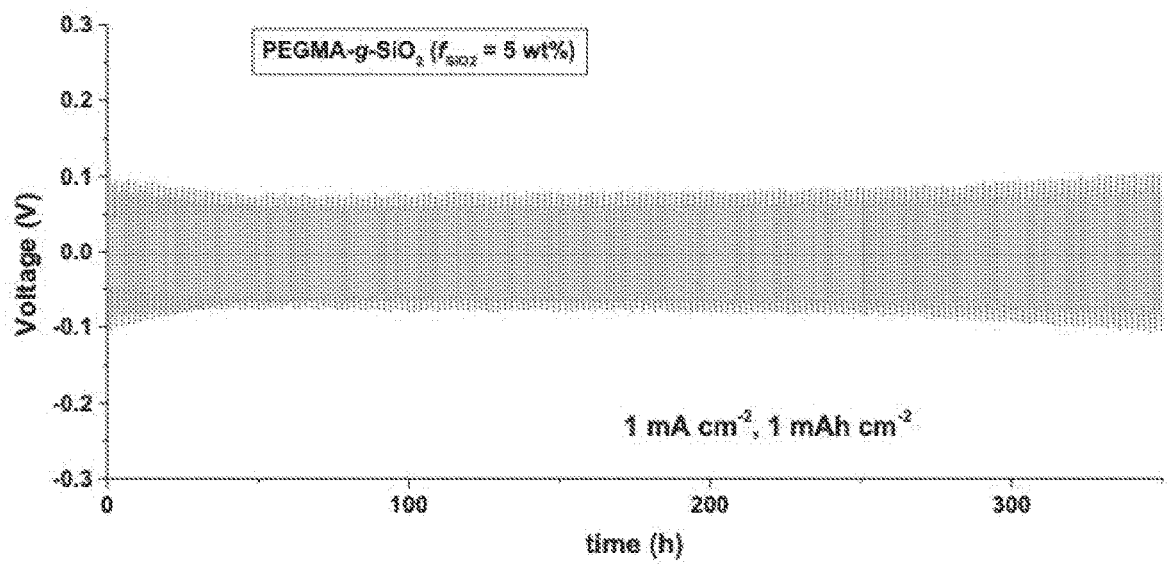
FIG. 16 illustrates symmetric cycling at a current density of 1 mA $cm^{-2}$, with 1 $LiPF_6$ in EC:DMC 1:1 as electrolyte, for Li chips coated with $PEGMA-g-SiO_2$ (relatively low inorganic content, $f_{SiO2}$=5 wt %).
Figure 17:
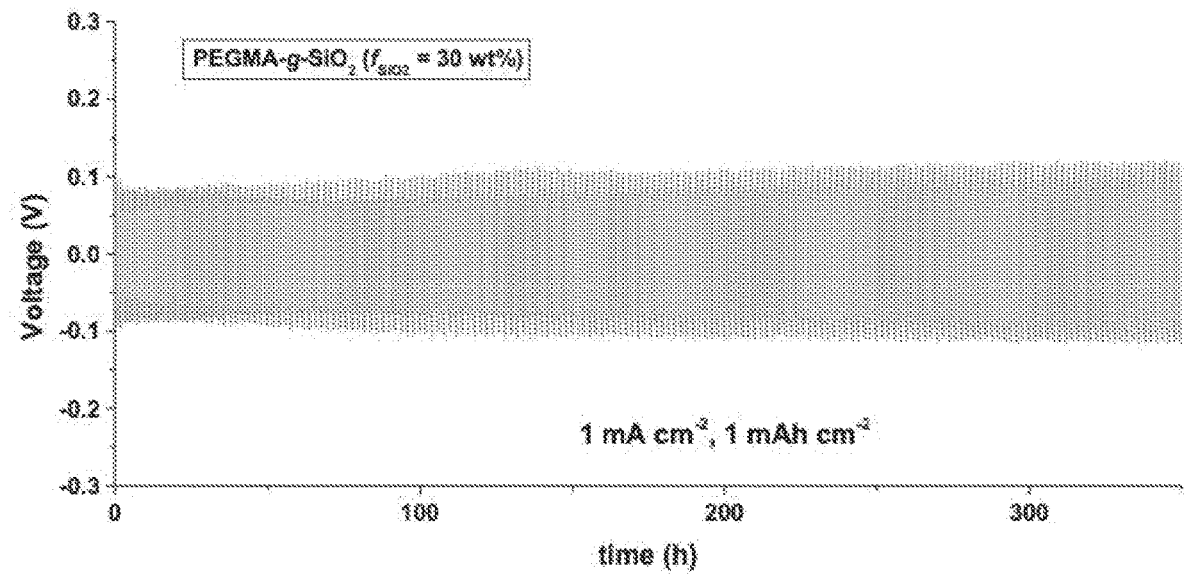
FIG. 17 illustrates symmetric cycling at a current density of 1 mA $cm^{-2}$, with 1 $LiPF_6$ in EC:DMC 1:1 as electrolyte, for Li chips coated with $PEGMA-g-SiO_2$ (intermediate inorganic content, $f_{SiO2}$=30.41 wt %).
Figure 18:
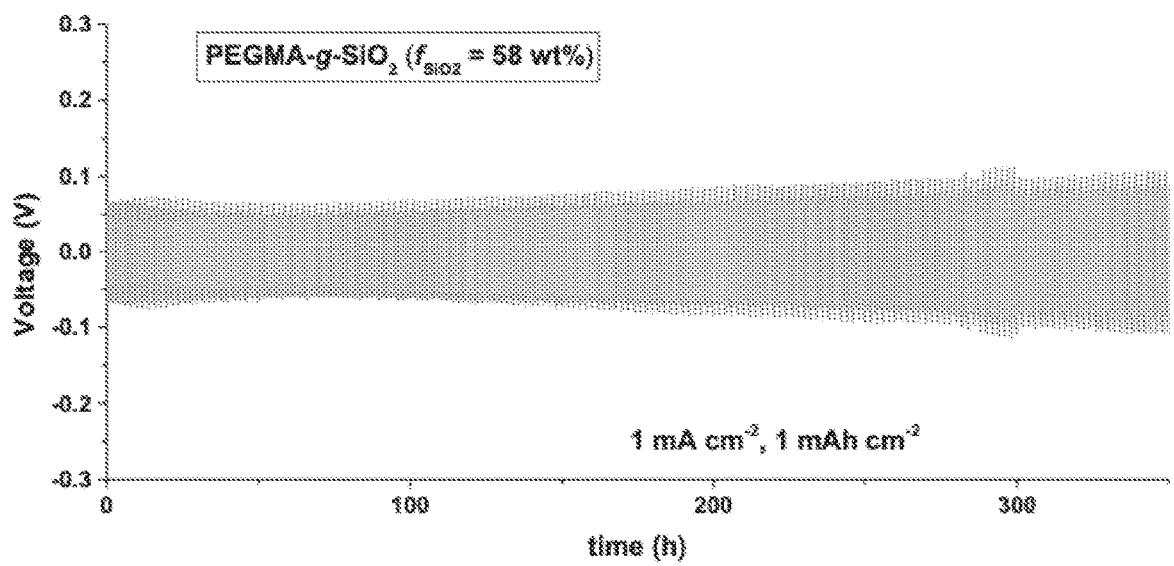
FIG. 18 illustrates symmetric cycling at a current density of 1 mA cm-2, with 1 LiPF6 in EC:DMC 1:1 as electrolyte, for Li chips coated with PEGMA-g-SiO2 (relatively high inorganic content, fSiO2=58.11 wt %).

Three types of YSZ-g-PAN hybrids with inorganic content of 13.5 wt %, 24.6 wt % and 71.1 wt % were tested as artificial SEI. To demonstrate the effectiveness of dendrite suppression of the artificial SEI, an optical microscope was used to detect the surface roughness of the lithium anode. A visualization cell was designed for the experiment as illustrates FIG. 12. The representative electrolyte used in the studies hereof was 1 M LiTFSI in dioxolane/dimethyl ether (DOL/DME, 1/1)+1 wt % LiNO$_3$. However, many different electrolytes may be used with electrodes including artificial SEI hereof. Under a current density of 5 mA/cm$^2$, the formation of a mossy lithium dendrite was immediately observed within 2 min in an uncoated lithium anode. In comparison, the surface of lithium anode coated with the artificial SEI hereof remained smooth during the same time span, indicating non-existence of dendrite formation (FIG. 13, panels (a) and (b)). To demonstrate the efficiency of lithium stripping/plating, symmetric cells made of two lithium anodes, one with and one without protection of artificial SEI, were assembled and run at current density of 3 mA/cm$^2$ with 1 hour for each half step. For bare lithium anode (without SEI protection), the cell started to polarize immediately and reached about 300 mV within 200 hours before shortage (FIG. 13, panel (c)). In contrast the electrode coated with an artificial SEI having 13.5 wt % inorganic content, the cycling showed lower initial overpotential at about 100 mV and as cycling proceeded, the voltage was stabilized at about 25 mV for over 350 hours before eventually shorted (FIG. 14A). Interestingly, with the increase of inorganic content, the symmetric cycling showed even more improved cycling stability. For electrode coated with artificial SEI having 71.1 wt % inorganic content, the symmetric cell at 3 mA/cm$^2$ lasted for over 2700 hours. However, the initial voltage showed certain degree of instability at 250-300 hours (FIG. 14B). This is possibly due to the trade-off of high brittleness of the membrane when using such high inorganic content. Cells protected with 24.6 wt % inorganic content, showed the best cycling performance which lasted for over 2500 hours with overpotential at about 20 mV FIG. 13, panel (c)) in the nonoptimized studies hereof. The sample also showed the highest Coulombic efficiency of 99.23% (Table 2), which is measured using a well-established approach.

TABLE 2

Measured Coulombic efficiency (CE) for samples protected with artificial SEI.

| Entry | Inorganic content (wt %) | Inorganic content (vol %) | Coulombic efficiency |
|---|---|---|---|
| 1 | 13.5 | 6.52 | 98.53 |
| 2 | 24.6 | 12.7 | 99.23 |
| 3 | 71.1 | 52.3 | 98.55 |

The resistance of cells with or without protection was measured by electrochemical impedance spectroscopy (EIS) before cycling and after cycling for 50 hours. Compared to cells with bare lithium, cells protected with artificial SEI having 24.6 wt % inorganic content showed lower and more stable resistance both before and after cycling, in accordance with a lower overpotential (see FIG. 13, panel (c)). Scanning electron spectroscopy (SEM) was used to study the surface morphology of the electrode before cycling. FIG. 13 panels (d) and (e) showed clear formation of lithium dendrite for cells without protection of the artificial SEI. In comparison, for cells protected with artificial SEI, no dendrite was observed at the electrode surface as illustrated in FIG. 13 panels (f) and (g), further demonstrating the efficiency of the protection of artificial SEI.

In summary of the above representative embodiments, a fatty-acid based initiator for grafting a radically synthesizable polymer such as PAN from Vo-rich YSZ NPs by SI-ATRP with high grafting density was developed. The as-synthesized YSZ-g-PAN hybrids with high inorganic content could be stably dispersed in organic solvents without precipitation for months. The immobilization of PAN chain end on the surface of YSZ NPs greatly reduced the polymer crystallinity, thereby increasing the ionic conductivity while improving the mechanical integrity and membrane-forming ability. The positively charged oxygen vacancy (Vo) of the YSZ NPs further reduced the ion gradient near the anode, increased the transference number while homogenizing the ion flux during lithium plating. The aforementioned benefits combined with the easiness of solution drop-casting leads to the facile creation of hybrid artificial SEI that enabled dendrite-free lithium stripping/plating with Coulombic efficiency as high as 99.23%. Such YSZ-g-PAN hybrids materials enriched the polymer-inorganic hybrids materials and provided new perspectives for the rational design of dendrite-free anodes.

Polymer-grafted $SiO_2$ nanoparticles were also prepared via SI-ATRP. A fatty acid inspired tetherable initiator BiBADA as described above attached onto the $SiO_2$ surface, forming $SiO_2$—Br nanoparticles that served as ATRP initiating sites. Polyethylene glycol monomethacrylate (PEGMA) was grown from the $SiO_2$—Br nanoparticles dispersed in a mixture of anisole and monomer, via activator regenerated by electron transfer (ARGET) ATRP. Different inorganic contents ($f_{SiO2}$) were achieved by changing the $SiO_2$—Br loading to target different degrees of polymerization (DP). By increasing the target DP, polymer brushes with higher molecular weight (MW) were grown, thus obtaining materials with decreased contents of inorganic nanoparticles. To analyze the effect of the inorganic content on the properties of the protective layers for Li anodes, PEGMA-g-$SiO_2$ with 3 different inorganic contents were prepared and tested: $f_{SiO2}$=5 wt %, 30.41 wt %, 58.11 wt %. Polymer brushes MW and dispersity (Đ), as determined by gel permeation chromatography (GPC, using DMF as eluent and poly(methyl methacrylate) standards for calibration) are reported in Table 3.

For comparison, a PEGMA homopolymer was prepared by ARGET ATRP. The polymerization was performed in water at T=25° C., using $CuBr_2$/TPMA as catalyst, ascorbic acid as reducing agent and 2-hydroxy ethyl bromoisobutyrate as water-soluble initiator. The polymer was precipitated in dichloromethane, followed by solvent evaporation under reduced pressure, then solubilized in THF and Cu was removed by passing through an alumina column. Finally, the polymer was precipitated in hexanes and dried in vacuum. The MW and D values measured by GPC are reported in Table 3.

TABLE 3

Properties of PEGMA brushes grafted onto $SiO_2$ nanoparticles through ARGET ATRP.

| PEGMA-g-$SiO_2$ | $f_{SiO2}$ (%) | $M_n$ | Đ | σ (nm$^{-2}$) |
|---|---|---|---|---|
| Low inorganic content | 5 | | | |
| Intermediate inorganic content | 30.41 | 18800 | 1.12 | 0.403 |
| High inorganic content | 58.11 | 9600 | 1.19 | 0.248 |
| No $SiO_2$ | — | 35900 | 1.19 | — |

Figure 19:
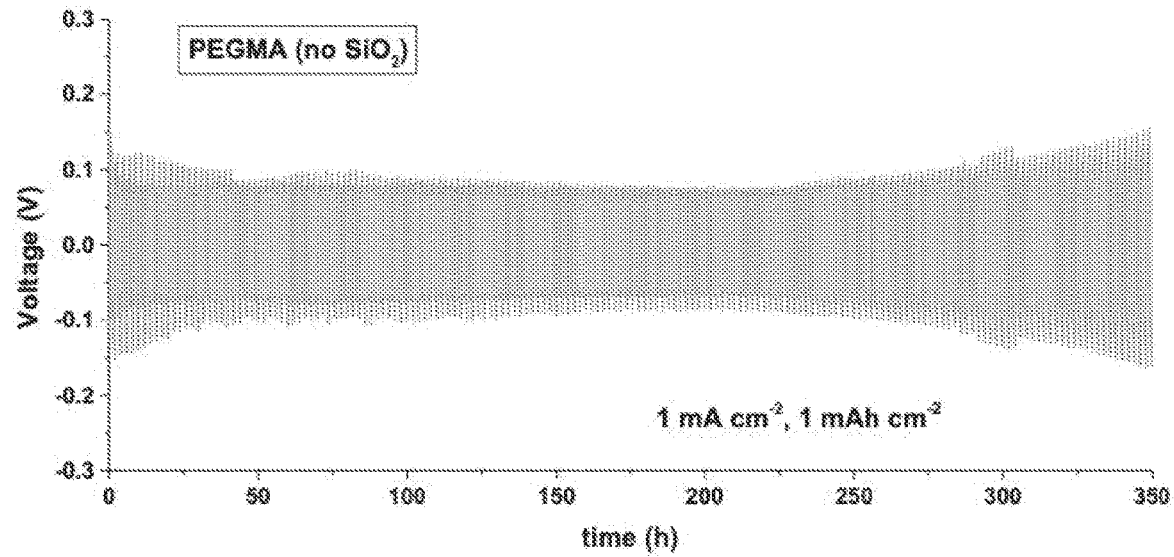
FIG. 19 illustrates symmetric cycling at a current density of 1 mA $cm^{-2}$, with 1 $LiPF_6$ in EC:DMC 1:1 as electrolyte, for Li chips coated with PEGMA homopolymer.

The effect of PEGMA-g-SiO2 artificial SEI on the electrochemical properties of Li metal anode was evaluated by symmetric cycling tests at different current densities and areal capacities, in a conventional LE composed of 1 M $LiPF_6$ in EC:DMC 1:1 (FIGS. 15-18). The cells showed stable cycling profiles for up to 350 h (i.e. 175 cycles). A slight increase in the overpotential was typically observed after 250-300 h, particularly for the coating with high inorganic content. The overpotential slightly increased with increasing the current density as expected. For comparison, when Li was coated with PEGMA homopolymer in the absence of inorganic nanoparticles, the initial overpotential was slightly higher and the cell started to polarize after 250 h, reaching higher overpotentials than in the case of Li chips with hybrid coatings (FIG. 19).

Artificial SEI based on fluoro/carboxylic acid bi-functional polymers were also prepared by, for example, atom transfer radical polymerization. In that regard, representative copolymers of tert-butylacrylate (tBA) and a semifluorinated acrylate monomer were prepared by supplemental activator and reducing agent atom transfer radical polymerization (SARA ATRP). See, for example, Konkolewicz, D.; Wang, Y.; Krys, P.; Zhong, M.; Isse, A. A.; Gennaro, A.; Matyjaszewski, K., SARA ATRP or SET-LRP. End of controversy?, *Polym. Chem.* 2014, 5, 4396. Random or block copolymers were achieved by mixing the two monomers or adding the fluorinated monomer upon reaching >90% conversion of tBA, respectively. The copolymer composition was tuned by changing the relative amount of the two monomers. Deprotection of the tBA units in the polymer yielded AA units as confirmed NMR. PAA homopolymer was prepared using a similar procedures for comparison.

Figure 20:
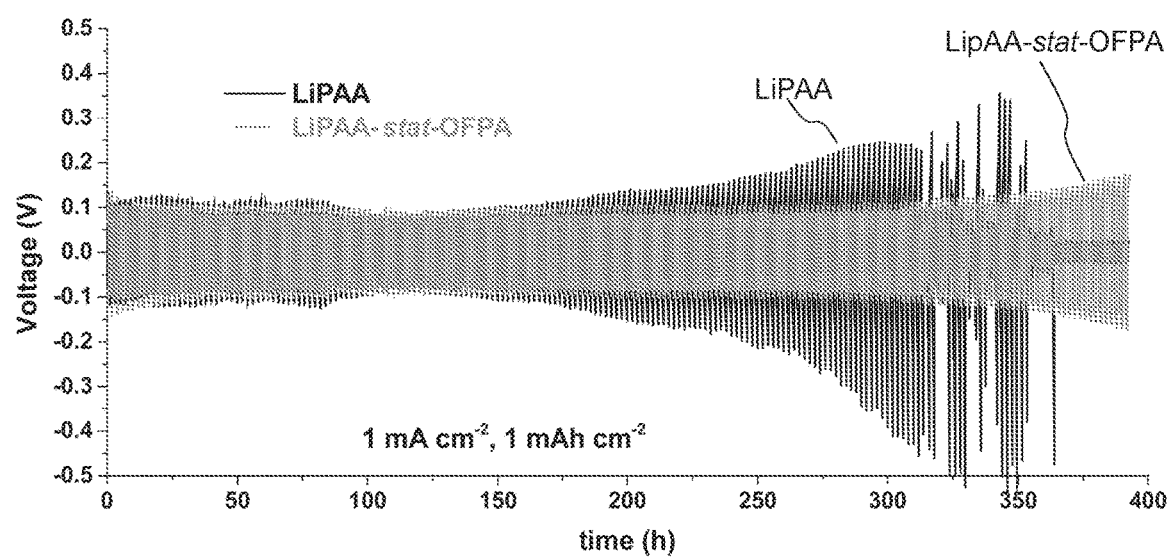
FIG. 20 illustrates symmetric cycling at 1 mA $cm^2$ of Li chips coated with PAA or PAA-stat-POFPA copolymer. Electrolyte: 1 M $LiPF_6$ in EC:DMC 1:1.

Solutions of 0.25 wt % (co)polymer (+50 wt % LiTFSI relative to (co)polymer) in THF (DMF for the PAA homopolymer) were prepared. Coatings on 10 mm diameter Li chips was formed via drop casting by depositing 15 µL of solution onto each chip through a micropipette. CR2032 type coin cells were assembled for symmetric cycling tests. The Li chips coated with a random copolymer of LiPAAiso-stat-POFPA$_{90}$ (poly octafluoropenthyl acrylate) showed better performance in symmetric cycling in LE than the Li chips coated with LiPAA, in the absence of fluorinated units (FIG. 20). Largely increasing the content of fluorinated units was observed to drastically decrease the performance of the coated Li chips.

Polymers suitable for use herein include, for example, PAA, poly(methacrylic acid) (PMMA), poly(glycidyl methacrylate) and polymers including immobilized cations (immobilized covalently or otherwise) to which fluoride counterions may be associated (for example, quaternized poly (2-dimethylamino)ethyl methacrylate). Polymers may, for example, be modified after polymerization to introduces carboxyl- and/or fluoro-functionality and/or fluoride counterions to the polymer. In the case of poly(glycidyl methacrylate), for example, the polymer may be functionalized by $NaN_3$ to obtain both azide groups and hydroxyl groups. The azide functionality can be further transformed to fluoro functionality by click chemistry as known in the art. The hydroxyl groups can be converted to carboxylic acid as in the case of poly-2-hydroxyethyl methacrylate or poly-HEMA.

The following fluoro-functionalized monomers may be polymerized via, for example, ATRP for synthesis of polymers hereof: 2,2,3,3,4,4,5,5,6,6,7,7-Dodecafluoroheptyl acrylate, 3,3,4,4,5,5,6,6,7,7,8,8,9,9,10,10,11,11,12,12,12-Heneicosafluorododecyl acrylate, 3,3,4,4,5,5,6,6,7,7,8,8,9,9,10,10,10-Heptadecafluorodecyl methacrylate, 2,2,3,3,4,4, 4-Heptafluorobutyl acrylate, 2,2,3,3,4,4,4-Heptafluorobutyl methacrylate, 2,2,3,4,4,4-Hexafluorobutyl methacrylate, 1,1,1,3,3,3-Hexafluoroisopropyl acrylate, 1,1,1,3,3,3-Hexafluoroisopropyl methacrylate, 2,2,3,3,4,4,5,5-Octafluoropentyl acrylate, 2,2,3,3,4,4,5,5-Octafluoropentyl methacrylate, 2,2,3,3-Tetrafluoropropyl methacrylate, 3,3,4,4,5,5,6,6,7,7,8,8,8-Tridecafluorooctyl acrylate and 2,2,2-Trifluoroethyl methacrylate.

Experimental Examples

Materials and characterizations for semiliquid lithium metal anode. Monomethoxy hydroxyl oligomeric ethylene glycol (MW=750), monomethoxy hydroxyl oligomeric ethylene glycol (MW=350), di-hydroxyl oligomeric ethylene glycol (MW=200), di-methoxy oligomeric ethylene glycol (MW=250), anhydrous tetrhydrofuan (THF) (>99.9%) were purchased from Sigma-Aldrich. Lithium bis(trifluoromethanesulfonyl)imide (LiTFSI) (>98%) was purchased from TCI America. Lithium chips (99.9%) and garnet type LLZTO powder were purchased from MTI Corporation.

X-ray diffraction (XRD) patterns of commercial LLZTO powder and LLZTO pellets were characterized on a PANalytical X'pert diffractometer with a Cu Kα radiation with scan range from 8-70° 2θ. The scanning electron microscopy (SEM) was performed on Philips XL30. Mechanical properties were assessed using an Anton Paar MCR-302 Rheometer fitted with a parallel plate tool with diameter D=25 mm. The samples were subjected periodic torsional shearing between two the parallel plates. The frequency sweeps were carried out at 120° C. at a constant applied shear strain of 0.1% (y) over a frequency range 0.001-100 Hz. 3D distribution of lithium mircoparticles in the polymeric medium were analyzed by microcomputed tomography (microCT) imaging using a Scanco μCT 50 (Scanco Medical, Bruttisellen, Switzerland) ex vivo microCT scanner with a 6.8 μm voxel resolution, 45 KVp beam energy, 133 μA intensity, 0.36 degrees rotation step (180 degrees angular range) and an exposure of 800 ms per view.

Specimens were packed in standardized plastic holders provided by the manufacturer by dripping molten state composite at elevated temperature. 3D volumes were generated automatically from raw files and calibrated using the Scanco software. microCT 3D morphometry and densitometry (DECwindows Motif 1.6, Scanco Medical) software was used for viewing and quantitative evaluation of images, as well as generation of 3D renderings of scanned specimen volumes. Particle diameter distribution within the measured sample were evaluated, calculated in 3D mode by the morphometry package of the software and after segmentation of lithium microparticles from the rest polymeric denser phase using a 196 grayscale value.

Preparation of semiliquid lithium metal anode (SLMA). The whole fabrication process was carried out in an argon-filled glove box with sub-ppm (parts per million) $O_2$ and $H_2O$ levels. In a typical procedure, 7.0 g of monomethoxy hydroxyl oligomeric ethylene glycol (MW=350, MHOEG) was mixed with 4.56 g lithium bis(trifluoromethanesulfonyl) imide (LiTFSI) in a 50 mL round bottom flask equipped with a stirring bar and heated at 200° C. to give a transparent liquid. Then 3.24 g lithium metal foil was preliminarily cut into small pieces (average size ~1 cm) and added to the MHOEG/LiTFSI mixture. The mixture was stirred at 1000 RPM on a heat plate. In the first 2 min, after reacting with the hydroxyl groups from the MHOEG, the size of the lithium chips was reduced to sub-millimeter particles. Within 5 min, a grey homogeneous emulsion was formed. The mixture was kept stirring for another 10 min. After the mixture was cooled down to room temperature, 20 mL of anhydrous THF was added into the flask. 444 mg of carbon black was then added into the suspension. Then the THF suspension was put in a sonication bath overnight. Afterwards, the suspension was heated at 90° C. to remove the THF. After drying under vacuum for overnight, a black gel-like metal/polymer composite was formed as final product.

Preparation of LLZTO solid electrolytes. Ta-doped LLZO (LLZTO) powder was purchased from MSE Supplies LLC. The LLZOT powder was kept in argon-filled glovebox with water and oxygen level less than 1 ppm. To make the LLZTO pellet, LLZTO powder was cold-pressed in 13 mm die and transferred into tube furnace. The cold-pressed LLZTO pellet was then sintered at 1050° C. for 10 hr with 10°/C heating and cooling rate under dry flow air. After sintering, the LLZTO pellet was immediately transferred into glovebox for further use.

Assembly of coin cell and electrochemical test. The electrochemical performance of SLMA was studied using a 2032-type coin cells (MTI) assembled using the following procedure. The set-up of coin cell is shown in FIG. 1A. First, stacked PTFE O-ring with 0.25 mm thickness and 8 mm inner diameter onto LLZTO pellet on both side; then the open space inside the PTFE O-ring was filled with SLMA on both sides; then the spacer and wave spring were finally pressed forming the coin cell. After assembly of the coin cell, it was transferred into oven at 65° C. All the electrochemical test, including symmetric cycling and EIS, were done at 65° C. and were conducted by Bio Logic VMP3 Multi-Channel Potential/Electrochemical Impedance Spectrometer. The symmetric cycling of SLMA was done with charge and discharge time for 1 hour without rest between the steps. For EIS test of the coin cell, measurements were taken after the coin cell was rest for 3 hrs. The data was collected between 600 kHz and 10 mHz by applying a 10 mV sinusoidal voltage perturbation.

Formation of a Li/PEO hybrid anode: In a typical procedure, 2 g PEO and 0.43 g LiTFSI were mixed under heat and stirred under vacuum until the mixture became transparent. (PEO/Li$^+$=30/1). The PEO/salt mixture, 0.179 g Li sheet (V(PEO)/V(Li metal)=5/1) and a stirring bead were added in a 20 mL glass vial thermostated at 210° C. in an IKA heat plate. The mixture was kept stirring overnight in argon atmosphere until a uniform fluidic composite was obtained. That was then quickly cooled to room temperature. Stoichiometry: The EO/Li$^+$ molar ratio: 30/1-10/1. PEO/Li metal volume ratio: 10/1-3/1.

Figure 4:
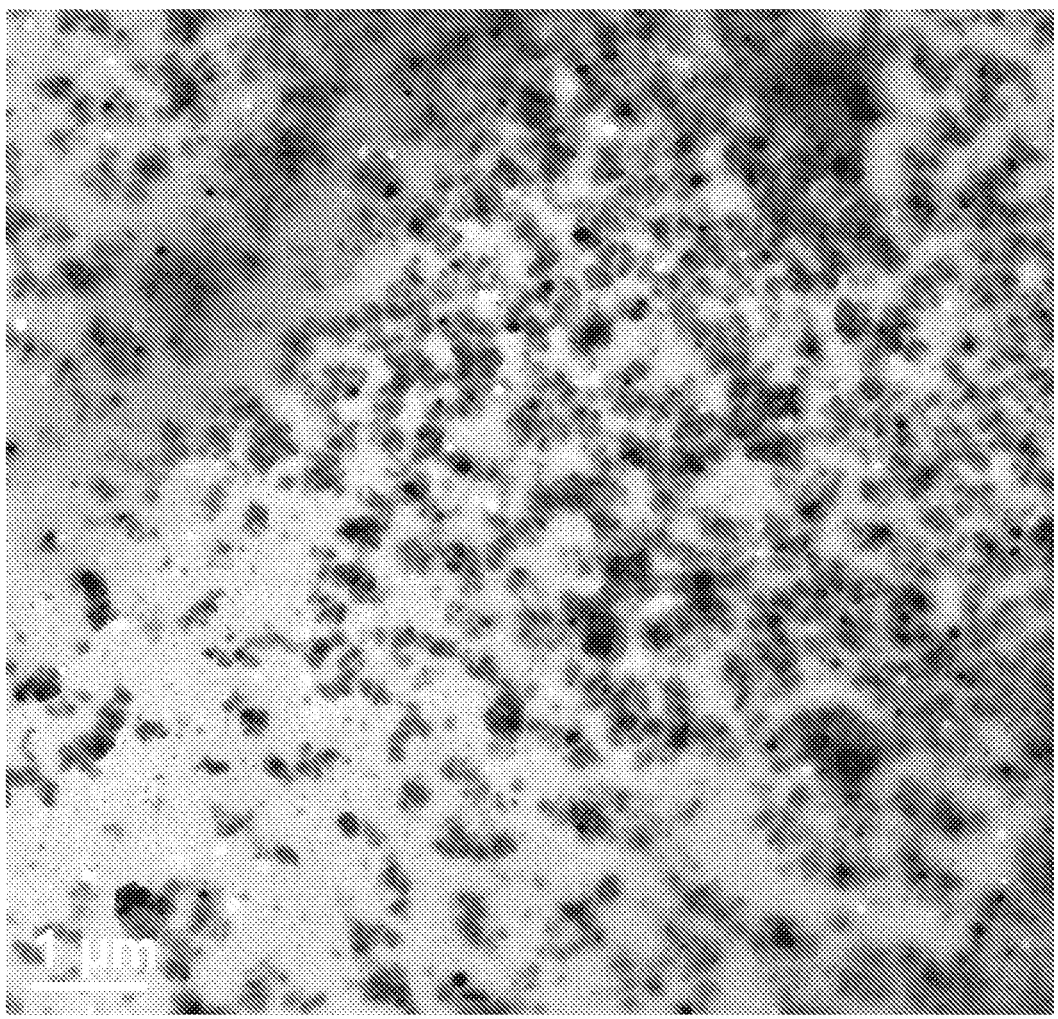
FIG. 4 illustrates a TEM images of a composite anode material containing $EO/Li^+=30/1$ $V(PEO)/V(Li)=5:1$ hereof wherein the scale bar=1 micron.

TEM images of hybrid anode materials with different ratios of lithium to PEO are provided in FIGS. 4 and 5. FIG. 4A shows the anode material prepared in run SL-9-57 with a PEO/Li$^+$=30/1, providing V(PEO)N(Li)=10:1. Scale bar=1 micron. The darker small particles are LiTFSI functioning as surfactant that adheres to the surface of the larger lithium metal particle. In FIG. 4B the same anode material is shown with a scale bar=100 nm. This allows a zoom in of the 1 micron size particles and appears to indicate that the lithium metal particles are porous! This is also confirmed that the final sample's volume is much higher than before mixing!

The TEM image shown in FIG. 4 is from anode materials made in run SL-9-58 with a PEO/Li$^+$=30/1 providing a V(PEO)/V(Li)=5:1. Scale bar=1 micron. This sample with a higher amount of lithium provides a distribution of the lithium metal that is even smaller and more homogeneous that the sample prepared in run SL-9-57. These images show that the distribution of the alkali metal in the formed anode material can be modified.

Materials for YSZ-g-PAN hybrid SEIs. Acrylonitrile (AN, Sigma-Aldrich, >99%) was purified by passing through a basic alumina column before use. Copper bromide (CuBr$_2$, Aldrich, 99%), hydrofluoric acid (HF, Aldrich, 48%), YSZ (Aldrich, <100 nm, 100 m$^2$/g), triethylamine (TEA, Alfa, 99%), AIBN (Aldrich, 98%), tris(2-dimethylaminoethyl)amine (Me$_6$TREN, Alfa, 99%), N,N-dimethylformamide (DMF, VWR, 99%), anhydrous magnesium sulfate (MgSO$_4$, Fisher), α-Bromophenylacetic acid (BPAA, Combi-Blocks, 98%), 1-(3-dimethylaminopropyl)-3-ethylcarbodiimide hydrochloride (EDC, Carbosynth, 97%), N-hydroxysuccinimide (NHS, Sigma-Aldrich, 98%), 12-aminododecanoic acid (TCI, >99%) were used as received.

Nuclear Magnetic Resonance Spectroscopy (NMR) $^1$H NMR spectroscopy measurements were performed on a Bruker Avance 300 MHz spectrometer and used to analyze the final product of BPADA in CDCl$_3$.

Size Exclusion Chromatography (SEC). Number-average molecular weights (M$_n$) and molecular weight distributions (MWD) of PAN-g-YSZ samples were determined by size exclusion chromatography (SEC). The SEC system used a Waters 515 HPLC pump and a Waters 2414 refractive index detector using Waters columns (Styrogel 102, 103, and 105 Å) with 10 mM LiBr-containing DMF as the eluent at a flow rate of 1 mL/min at 50° C. using linear poly(ethylene oxide) (PEO) calibrations.

Dynamic Light Scattering (DLS). DLS using a Malvern Zetasizer Nano ZS was employed to determine volume-weighted average hydrodynamic radius and distribution. The particle brushes were suspended in filtered DMF (4.5 μm PTFE filter) at low concentrations.

Thermogravimetric Analysis (TGA). TGA with TA Instruments 2950 was used to measure the fraction of YSZ in the hybrids. The data were analyzed with TA Universal Analysis. The heating procedure involved four steps: (1) jump to 120° C.; (2) hold at 120° C. for 10 min; (3) ramp up at a rate of 20° C./min to 800° C.; (4) hold for 2 min. The organic content of the samples were normalized to the weight loss between 120° C. and 800° C. The graft densities were calculated using a previously reported equation.

Grafting density was calculated using formula (S1).

$$\sigma_{TGA} = \frac{(1 - f_{YSZ})N_A A_s}{f_{YSZ} M_n} \quad (S1)$$

The value for f$_{YSV}$, in the equation, is the inorganic fraction measured by TGA after exclusion of any residual solvent; NA is the Avogadro number; A$_s$ is the specific surface area provided by the supplier; Mn is the number average molecular weight of polymer brushes.

Synthesis of BPADA. α-Bromophenylacetic acid (BPAA, 4.30 g, 20.0 mmol) and 1-(3-dimethylaminopropyl)-3-ethylcarbodiimide hydrochloride (EDC.HCl, 4.60 g, 24.0 mmol) were mixed in 250 mL of DCM in a 500 mL round bottom flask then followed by adding N-hydroxysuccinimide (NHS, 0.3 g, 2.0 mmol). The mixture was allowed to react for 30 minutes, then 12-aminododecanoic acid (4.31 g, 20.0 mmol) was added to the flask. The reaction was placed under room temperature and stirred for 17 hours. After completion, the reaction mixture was separated by extraction with dilute HCl solution (pH=3, 3×) then brine (pH=3, 3×). The filtrate was then dried with anhydrous MgSO$_4$ and the organic solvent was removed under reduced pressure yielding 5.4 g of BPADA (65% yield). The final compound was analyzed by $^1$H-NMR: (300 MHz, Chloroform-d) δ 12.04-11.95 (s, 1H), 9.82-8.63 (s, 1H), 7.60-7.35 (m, 5H), 5.45 (s, 1H), 3.42-3.24 (m, 2H), 2.35 (t, J=7.5 Hz, 2H), 1.43-1.17 (m, 18H).

Synthesis of YSZ-g-PAN hybrids materials. In a typical procedure, 1 g (1.0×10$^{20}$ nm$^2$) of YSZ (Aldrich, <100 nm, 100 m$^2$/g) were mixed with 0.342 g (0.83 mmol) of BPADA and 116 μL (0.83 mmol) of TEA (Alfa, 99%) and dispersed in 10 mL of THF (EMD, 99.9%). The dispersion was sonicated overnight. Consequently, the initiator-functionalized YSZ NPs were unable to fully precipitate from tetrahydrofuran (THF) even at a rotational centrifugal force (RCF) of 4000 G, indicating successful anchoring of organic moieties onto the inorganic surface. The dispersion was then dialyzed against acetone in three cycles with a MWCO of 10K. The solvent was removed in vacuo. To polymerize AN from YSZ, 0.3 g of the initiator-functionalized YSZ was dispersed in a mixture of 2.6 mL (40 mmol) of AN (Aldrich, 99%) and 3.9 mL of DMSO (Fisher, 99.9%). 55 μL (5.0 μmol) of 20 mg/mL CuBr$_2$ (Aldrich, 99%/6) solution in DMF (Fisher, 99.9%) were added. The solution was sonicated overnight to fully disperse the YSZ NPs. Then, 2.5 mg (15 μmol) of recrystallized AIBN (Aldrich, 98%) and 4.0 mg (15 μmol) of Me$_6$TREN (Alfa, 99%) were added. The reaction was degassed by nitrogen bubbling before heated up to 65° C. The reaction proceeded for a desired period. The polymerization mixture was then purified by dialysis against DMF in three cycles with a MWCO of 10K resulting in a stable translucent dispersion.

Materials for PEGMA-g-SiO$_2$P hybrid particle SIEs: SiO$_2$ nanoparticles (15 nm diameter); oligo(ethylene glycol) monomethyl ether methacrylate (OEOMA, M$_n$ 500) monomer passed through basic alumina to remove the inhibitor; copper(II) bromide (CuBr$_2$, 99%); tris[2-(dimethylamino)ethyl]amine (Me$_6$TREN, 97%); lithium bis(trifluoromethanesulfonyl)imide (LiTFSI); anisole (>99%); tetrahydrofuran (THF, >99%); hexanes (95%); were purchased from Sigma-Aldrich. Tris(2-pyridylmethyl)amine (TPMA, 97%) was purchased from Ambeed; tin(II) 2-ethylhexanoate (Sn$^{II}$(EH)$_2$, 95%) was purchased from Alfa Aesar. Coin cell cases (type CR2032, 304SS); stainless steel spacers (15.8 mm diameter); wave springs were purchased from MTI. Celgard separator. Li chips (16 mm diameter, 500 μm thickness). Cu foil. Liquid electrolytes: 1 M lithium hexafluorophosphate (LiPF$_6$) in ethylene carbonate/dimethyl carbonate (EC/DMC 1/1) was purchased from Sigma-Aldrich; 1 M lithium bis(trifluoromethanesulfonyl)imide (LiTFSI) in dioxolane/dimethoxyethane (DOL/DME 1/1) and 1 wt % lithium nitrate (LiNO$_3$).

Synthesis of PEGMA-g-SiO$_2$: Polymer grafted SiO$_2$ nanoparticles have been prepared by ATRP. A fatty acid inspired tetherable initiator BiBADA has been attached onto the SiO$_2$ surface, forming SiO$_2$—Br nanoparticles that serve as ATRP initiating sites. PEGMA has been grown from the SiO$_2$—Br nanoparticles dispersed in a mixture of anisole and monomer, via activator regenerated by electron transfer (ARGET) ATRP. Polymerizations were performed at 50° C., using CuBr$_2$/Me$_6$TREN as catalyst and Sn$^{II}$(EH)$_2$ as reducing agent. All polymerizations were stopped after 45-60 minute's and polymer grafted nanoparticles were recovered by precipitation in hexane and centrifuge. Purified PEGMA-g-SiO$_2$ were solubilized in THF under sonication.

Preparation of PEGMA-g-SiO$_2$ solutions for Li metal coating. Solutions of 1 wt % of total solids in THF were prepared by diluting the initial solutions, upon addition of LiTFSI (with a molar ratio Li/EO units 1/10). The as prepared solutions were stored inside a dry box.

Procedure of creation of artificial SEI and coin cell assembly. The following operations were performed inside the dry box, unless otherwise stated. Li chips (thickness 500 µm, diameter 16 mm) were cut into 10 mm diameter chips, upon levelling the surface by rolling a small load on top. The coating was realized by drop casting. Three droplets were deposited onto each chip and the solvent was let to evaporate overnight. Subsequently, CR2032 type coin cells were assembled for symmetric cycling tests. Each coin cell consisted of the following components, assembled in the reported order: a stainless steel case, a stainless steel spacer, a Cu collector, a coated Li chip, a drop of liquid electrolyte (LE), a Celgard separator, two drops of LE, a coated Li chip, a Cu collector, a stainless steel spacer, a stainless steel spring, a stainless steel case. Each cell was pressed and labeled, then extracted from the dry box and let rest for one day before starting the tests.

For comparison, coin cells with bare Li chips were prepared using a similar procedure, except that the coating was not applied.

Synthetic approach of fluoro/carboxylic acid dual functional polymer: Copolymers of tert-butylacrylate (tBA) and a semifluorinated acrylate monomer were prepared by supplemental activator and reducing agent atom transfer radical polymerization (SARA ATRP).[23] In this procedure, a Cu wire (activated by washing in $CH_3OH:HCl$ 2:1) serves for the continuous reduction of the ATRP deactivator $CuBr_2$/tris[2-(dimethylamino)ethyl]amine ($Me_6TREN$). A fluorinated alcohol with analogous structure as the fluorinated monomer was used as a solvent (35-45 vol % of total volume) to i) solubilize the fluorinated monomer/polymer, ii) avoid deleterious effects of the transesterification reaction between the alcohol and the monomer enabled by $Me_6TREN$. Dimethylsulfoxide (5 vol % of total volume) was used as a co-solvent to enhance the ATRP activity of the catalyst. Random or block copolymers were achieved by mixing the two monomers or adding the fluorinated monomer upon reaching >90% conversion of tBA, respectively. The copolymer composition was tuned by changing the relative amount of the two monomers.

The copolymers were precipitated in hexanes using tetrahydrofuran (THF) as a cosolvent, or dissolved in THF and filtered through basic alumina to remove Cu, then purified by dialysis (10 kDa molecular weight cut off, MWCO, membrane) in dichloromethane (DCM) for 2 days. The purified copolymers were dissolved in a 1:1 mixture of DCM:trifluoroacetic acid (TFA) and stirred at room temperature for 24 h. The deprotection of the tBA units to yield AA units was checked by NMR. Then, the solvent was removed, and the polymer was dissolved in acetone (repeated 3 times). Finally, the copolymer was dialyzed against DCM for 2 days (MWCO 2 kDa). PAA homopolymer was prepared using a similar procedure for comparison.

Li coating procedure and coin cell assembly: Solutions of 0.25 wt % (co)polymer (+50 wt % LiTFSI relative to (co)polymer) in THF (DMF for the PAA homopolymer) were prepared and stored inside a dry box. Li chips (thickness 500 micron, diameter 16 mm) were cut into 10 mm diameter chips, upon levelling the surface by rolling a small load on top. The coating was realized by drop casting, by depositing 15 µL of solution onto each chip through a micropipette. The solvent was let to evaporate overnight. Subsequently, CR2032 type coin cells were assembled for symmetric cycling tests. Each coin cell consisted of the following components, assembled in the reported order: a stainless steel case, a Cu collector, a coated Li chip, a drop of liquid electrolyte (LE), a Celgard separator, two drops of LE, a coated Li chip, a Cu collector, a stainless steel spacer, a stainless steel spring, a stainless steel case. Each cell was pressed and labeled, then extracted from the dry box and let rest for one day before starting the tests. The LE was 1 M $LiPF_6$ in EC:DMC 1:1.

The foregoing description and accompanying drawings set forth a number of representative embodiments at the present time. Various modifications, additions and alternative designs will, of course, become apparent to those skilled in the art in light of the foregoing teachings without departing from the scope hereof, which is indicated by the following claims rather than by the foregoing description. All changes and variations that fall within the meaning and range of equivalency of the claims are to be embraced within their scope.

What is claimed is:

1. A process for the formation of a deformable battery electrode, comprising: mixing a metal component comprising at least one of a metal or a metal alloy, a polymer component, and a dispersant component to create a mixture, heating the mixture to a temperature above the melting point of the metal or the metal alloy, agitating the mixture to form a dispersion of the metal or the metal alloy in the mixture, and subsequently cooling the mixture to a temperature below the melting point of the metal or the metal alloy to form a stabilized dispersion of the metal or the metal alloy, the polymer component comprising a polymer having a melting point equal to or below that of the metal or the metal alloy and a glass transition temperature sufficiently low that the stabilized dispersion is deformable.

2. The process of claim 1 wherein the metal or the metal alloy has a melting point below 300° C.

3. The process of claim 1 wherein the polymer has a glass transition temperature no greater than 25° C.

4. The process of claim 1 wherein the polymer has a glass transition temperature no greater than 0° C.

5. The process of claim 1 wherein a storage modulus of the deformable battery electrode is less than a loss modulus.

6. The process of claim 1 wherein the metal or the metal alloy is an alkali metal or an alkali metal alloy.

7. The process of claim 6 wherein the metal is lithium, sodium or potassium.

8. The process of claim 6 wherein the metal is lithium.

9. The process of claim 6 wherein the dispersion of the metal is a nano dispersion or a micro dispersion.

10. The process of claim 7 wherein the dispersant component comprises at least one of a salt of the metal or the polymer.

11. The process of claim 10 wherein the polymer is a single-ion polymer in which the metal is bound to an anion of the polymer or the polymer comprises at least one function group that reacts with the metal to form a single-ion polymer.

12. The process of claim 11 wherein the polymer comprises one or more groups distributed along the polymer backbone or present in one or more side chains that interact with the metal or the metal alloy.

13. The process of claim 12 wherein the one or more groups include at least one of N, O, S, F, Cl, Br, I, P, C, or Si.

14. The process of claim 1 further comprising incorporating a conductive additive in the deformable battery electrode.

15. The process of claim 10 further comprising incorporating a conductive additive in the deformable battery electrode.

16. The process of claim 15 wherein the conductive additive comprises at least one of the metal salt, a conductive carbon or a conductive polymer.

17. The process of claim 16 wherein the conductive additive comprises the conductive carbon and is incorporated after the mixture is cooled.

18. The process of claim 17 further comprising creating a suspension by adding a solvent to the stabilized dispersion after cooling, adding the conductive additive and subsequently removing the solvent.

19. The process of claim 10 wherein the polymer has a weight average molecular weight less than 2000.

20. The process of claim 10 further comprising creating a suspension by adding a solvent to the stabilized dispersion after cooling, sonicating the suspension, and subsequently removing the solvent.

21. The process of claim 20 further comprising adding a conductive additive to the suspension before removing the solvent.

22. The process of claim 1 wherein a particle size of the metal in the stabilized dispersion varies from the average particle size by no more than 100%.

23. The process of claim 1 wherein a shear modulus of the polymer is less than 1 MPa.

24. The process of claim 1 wherein an ionic conductivity of the polymer at room temperature is at least $10^{-6}$ S/cm.

* * * * *